(12) United States Patent
Yatabe

(10) Patent No.: US 6,286,676 B1
(45) Date of Patent: Sep. 11, 2001

(54) CASSETTE STORAGE CASING

(75) Inventor: Kazumoto Yatabe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/029,618

(22) PCT Filed: Jun. 24, 1997

(86) PCT No.: PCT/JP97/02176

§ 371 Date: Sep. 21, 1998

§ 102(e) Date: Sep. 21, 1998

(87) PCT Pub. No.: WO98/01369

PCT Pub. Date: Jan. 15, 1998

(30) Foreign Application Priority Data

| Jul. 8, 1996 | (JP) | 8-178138 |
|---|---|---|
| Jul. 9, 1996 | (JP) | 8-179457 |
| Jul. 9, 1996 | (JP) | 8-179458 |
| Sep. 11, 1996 | (JP) | 8-240442 |

(51) Int. Cl.$^7$ .................................. B65D 85/672
(52) U.S. Cl. .................. 206/387.12; 206/472; 206/493
(58) Field of Search ............................. 206/387.1, 387.13, 206/308.1, 493, 815, 472, 387.12, 475

(56) References Cited

U.S. PATENT DOCUMENTS

| 3,760,937 | 9/1973 | Van Wyngarden et al. . |
| 4,406,369 | 9/1983 | Wallace et al. . |
| 5,913,423 | * 6/1999 | Sasaki ..................... 206/387.12 |

FOREIGN PATENT DOCUMENTS

| 38 16 384 A1 | 11/1989 | (DE) . |
| 93 00 553 | 3/1993 | (DE) . |
| 0 493 845 A2 | 7/1992 | (EP) . |
| 2 306 498 A | 10/1976 | (FR) . |
| 2 508 222 A | 12/1982 | (FR) . |
| 65679 | 5/1983 | (JP) . |
| 118672 | 8/1985 | (JP) . |
| 574 | 1/1987 | (JP) . |
| 10-77087 | * 3/1998 | (JP) ................................ 206/387.12 |

OTHER PUBLICATIONS

Search Report and Examination Report from corresponding Singapore 0718 application dated Dec. 29, 1999.

* cited by examiner

Primary Examiner—Shian Luong
(74) Attorney, Agent, or Firm—Ronald P. Kananen; Rader, Fishman & Grauer

(57) ABSTRACT

A cassette accommodating case formed integrally of a lower half 1 and an upper half 2 has a cassette insertion opening 3 at is one side surface. A finger-insertion opening portion 24 used for drawing a cassette is formed through an upper surface of the upper half 2. A reel stopper member 9 in which a pair of reel stopper pieces 11, 11 capable of rising and being pressed down and engaged with reel hub apertures 32a, 32b of a compact cassette 30 is fixed on a bottom surface of the lower half 1. A traverse U-letter shaped slit groove 13 is formed through a portion of the base late where the reel stopper pieces 11, 11 are planted, thereby the reel stopper member being formed as a reel stopper member having a flexible base plate 10c which is flexibly deformed. A cantilever-shaped cassette-release preventing member 19 having an elastic function and engaged with a concave portion 22a of the erroneous-erasure preventing click 22 on a rear surface of the cassette in its accommodated state is provided on an inner wall surface of a cassette housing in the vicinity of the opposite side of the cassette insertion opening 3.

30 Claims, 24 Drawing Sheets

F I G. 17
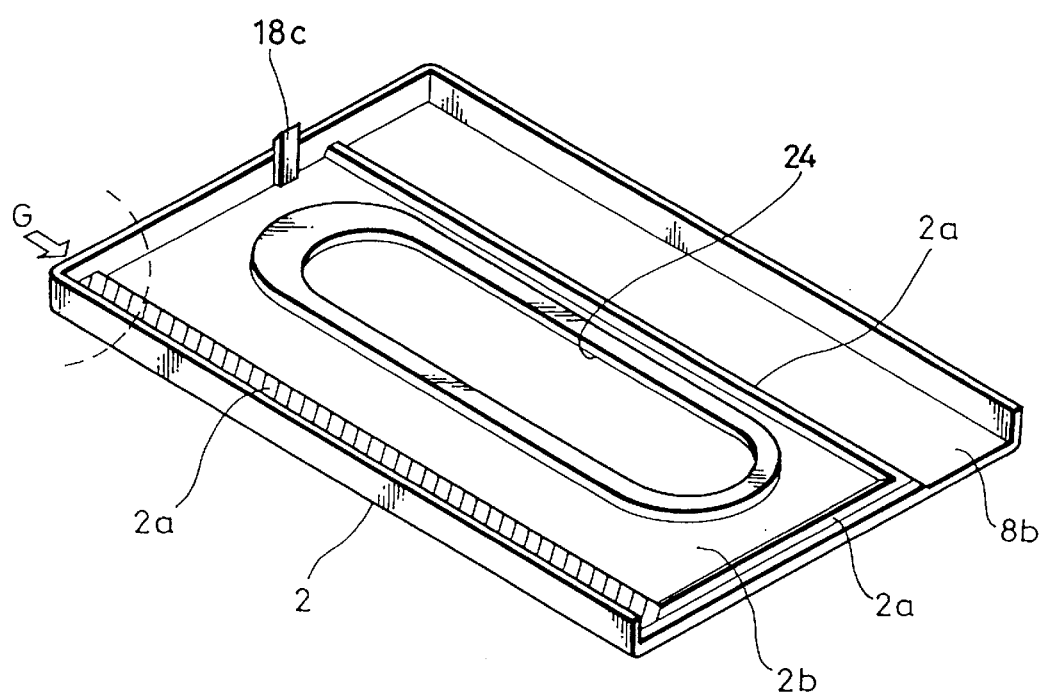

F I G. 21
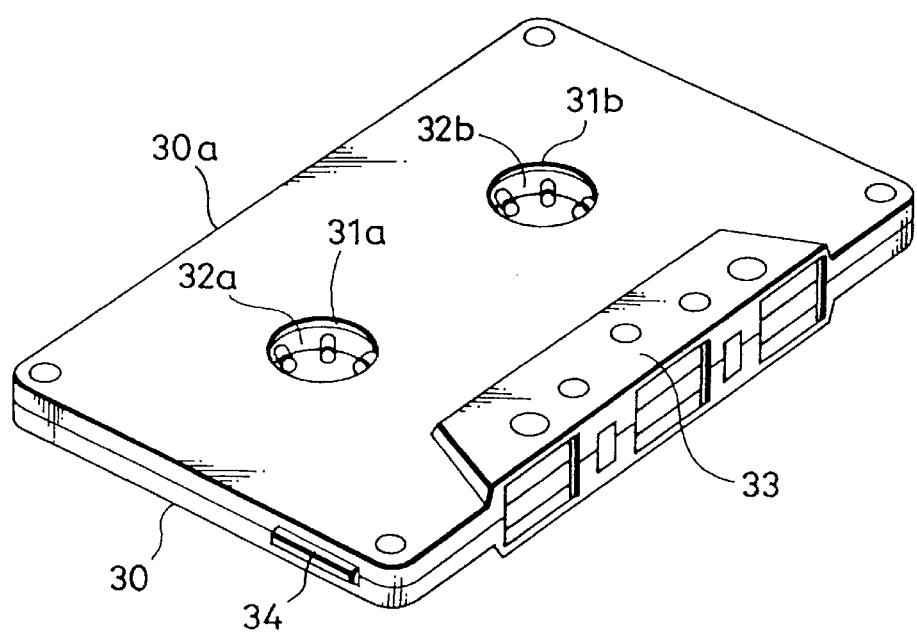

F I G. 24
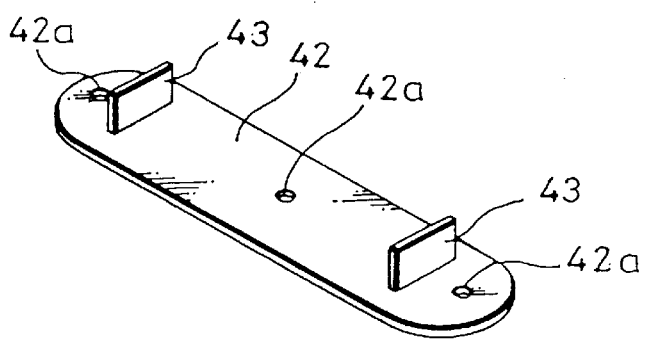

CASSETTE STORAGE CASING

TECHNICAL FIELD

The present invention relates to a cassette accommodating case suitable for accommodating an audio compact cassette and particularly to a cassette accommodating case into and from which a compact cassette can slidably be inserted and drawn in the longitudinal direction of the cassette accommodating case through a cassette insertion opening provided at one side portion of the case and which has a function of preventing a tape reel from being rotated, in a compact cassette accommodated state, by engaging a reel hub aperture of the cassette with a reel-rotation preventing member attached to a case bottom surface and a function of preventing the compact cassette brought in its accommodated state from being drawn from the case.

BACKGROUND ART

Some cassette accommodating cases into and from each of which a compact cassette can slidably be inserted and drawn in the longitudinal direction of the cassette accommodating case through a cassette insertion opening provided at one side portion of the case are disclosed in, for example, Japanese laid-open utility model publication No. 57-201675, Japanese laid-open utility model publication No. 58-148774, Japanese laid-open utility model publication No. 4-118388, and Japanese laid-open patent publication No. 4-311483.

Of the cassette accommodating cases according to the prior art, a cassette accommodating case disclosed in Japanese laid-open utility model publication No. 4-118388 will be described with reference to FIGS. 20 to 23.

FIG. 20 is a perspective view of the a cassette accommodating case with an upper surface plate thereof being partially cut away, showing an inside thereof. FIG. 21 is a perspective view of a compact cassette. FIG. 22 is a plan view of a cassette accommodating case with a cassette in its accommodated state being shown by a phantom line. FIG. 23 is a side view of the cassette accommodating case in its cassette accommodating state, seen from its cassette insertion opening.

An arrangement of the compact cassette will be described with reference to FIG. 21.

A compact cassette 30 has a pair of tape reels, not shown, rotatably housed in its cassette housing. Reel hub apertures 32a, 32b correspond to a pair of opening portions 31a formed through upper and lower surfaces of a cassette housing 30a and a pair of opening portions 32a formed therethrough. The compact cassette 30 has a trapezoid projected portion 33 forming a mouth of the cassette at its one side portion and also has a guide projection (usually also referred to as an ear portion) 34 at both side surfaces on the projection portion 33 side of the cassette housing.

The cassette accommodating case is formed of a plastic molded product. The cassette accommodating case has a cassette insertion opening 35 at its one side surface and has, in other portions, a flat-box shape formed of a bottom surface plate 36a, an upper surface plate 36b, left and right side surface plates 36c, 36d and a rear surface plate 36e. The compact cassette 30 is slidably inserted into and drawn from the cassette accommodating case through the cassette insertion opening 35 in the longitudinal direction. The bottom surface plate 36a and the upper surface plate 36b respectively have notch portions 35a, 35b on the sides of the cassette insertion opening 35. Therefore, when the compact cassette 30 accommodated in the cassette accommodating case is drawn therefrom, the compact cassette can be drawn by gripping cassette end portions exposed through the notch portions 35a, 35b as shown in FIG. 22.

The bottom surface plate 36a has two tab-shaped real stopper pieces 37a, 37b which can rise by their elastic forces and which are formed integrally therewith at positions corresponding to a substantially middle portion of the cassette insertion opening 35 at an interval in the depth direction. The reel stopper pieces 37a, 37b are faced in the direction perpendicularly to the depth direction. The interval between the reel stopper pieces 37a, 37b corresponds to an interval between the reel hub apertures 32a, 32b of the compact cassette 30.

The bottom surface plate 36a has receiving guides 38a, 38b projectingly formed at positions across the reel stopper pieces 37a, 37b so as to be thick and extended in the depth direction. The upper surface plate 36b also has receiving guides 39a, 39b projectingly formed so as to be thick and opposed to the receiving guides 38a, 38b, respectively (see FIG. 23).

Moreover, the bottom surface plate 36a and the upper surface plate 36b respectively have stopper pieces 40a, 40b and 41a, 41b in the vicinity of the cassette insertion opening 35 and at the outsides of the receiving guides 38a, 38b and 39a, 39b so as to be opposed to each other.

When the compact cassette 30 is inserted into the cassette accommodating case thus arranged through its cassette insertion opening 35 with its guide projection 33 being inserted first, the compact cassette elastically deforms and pushes down the reel stopper pieces 37a, 37b. However, when the cassette is inserted and reaches the deepest position of the cassette accommodating case, the reel stopper pieces 37a, 37b respectively correspond to the reel hub apertures 32a, 32b and hence rise again by their elastic forces. Then, the reel stopper pieces are respectively engaged with the reel hub apertures 32a, 32b to thereby prevent the reels from being rotated.

In a state that the compact cassette 30 is accommodated in the cassette accommodating case, since the receiving guides 38a, 38b and 39a, 39b projectingly formed from the bottom surface plate 36a and the upper surface plate 36b hold upper and lower surfaces of the cassette 30 except the projection portion 33, respectively, as shown in FIG. 23, the compact cassette 30 can stably be accommodated in the cassette accommodating case without being shaky.

Moreover, in the accommodated state of the compact cassette 30, as shown in FIG. 22, since the side edge portions of the projection portions 33 are engaged with stopper pieces 40a, 41a, the compact cassette 30 is prevented from being drawn from the cassette accommodating case.

The compact cassette 30 can be inserted into the above cassette accommodating case similarly as described above even in a state that it is inverted in the left and right directions. In this case, the side edge portions of the projection portions 33 of the compact cassette 30 are engaged with the other stopper pieces 40b, 41b, thereby the compact cassette being prevented from being drawn from the cassette accommodating case.

When the compact cassette 30 is drawn from the cassette accommodating case, the reel stopper pieces 37a, 37b are elastically deformed and pressed down to be disengaged from the reel hub apertures 32a, 32b. After the cassette is drawn therefrom, the reel stopper pieces 37a, 37b rise up again by their elastic forces.

Whenever the compact cassette 30 is inserted or drawn, the reel stopper pieces 37a, 37b are elastically deformed in the vicinity of their base portions and then pressed down. If the reel stopper pieces 37a, 37b are repeatedly and intensively bent and deformed, then fatigue in elasticity is caused in materials of the reel stopper pieces themselves and hence disables the reel stopper pieces to rise again. As a result, it becomes difficult for the reel stopper pieces to stop rotation of the reels thereafter.

If as a reel stopper of this kind there is employed a reel stopper member arranged such that, as shown in FIG. 24, two tab-shaped reel stopper pieces 43, 43 molded out of PP (polypropylene) are planted integrally on a base plate 42 and the base plate 42 are fixed by caulking on a bottom surface of the cassette accommodating case through a plurality of caulking apertures 42a, it is required to set a width of each of the reel stopper pieces 43, 43 substantially equal to an inside diameter of the reel hub aperture in order to prevent the reel from being rotated. This arrangement lowers operability of drawing the cassette because the reel stopper pieces are engaged with the reel hub apertures when the cassette is drawn from the cassette accommodating case.

While a relationship between the reel stopper pieces 43 and the reel hub apertures is important as described above, a height of each of the reel stopper pieces must be set substantially as high as an upper portion of the hub aperture in order to lock the reel hub apertures when the reel stopper pieces are engaged with and inserted into the reel hub apertures at their center portions. This arrangement leads to a fatal problem that when the cassette is deeply inserted into the cassette accommodating case, the reel stopper pieces are pressed down and prevented by edge portions of he hub apertures from rising in the hub apertures.

The above cassette accommodating case has a function to prevent the compact cassette 30 accommodated therein from being freely drawn therefrom by engaging side edge portions 33a of the projection portions 33 of the cassette 30 with the stopper pieces 40a and 41a or 40b and 41b projectingly formed on the bottom surface plate 36a and the upper surface plate 36b in the vicinity of the cassette insertion opening 35.

However, since the stopper pieces of this kind do not have elasticity themselves and hence the compact cassette 30 are slid rubbing surfaces of the projection portions 33 when being repeatedly inserted and drawn, there is then the problem that scratches are produced on the projection portions 33 and shavings are produced. In particular, if the friction of the stopper pieces with the projection portions 33 lowers the projecting heights of the stopper pieces, then a function of engagement of the stopper pieces with the projection portions 33 is lowered, which disables a function of preventing the compact cassette from being freely drawn from the cassette accommodating case.

Another mechanism for preventing a compact cassette from being freely drawn can be considered in which a stopper projection, not shown, is provided at a side surface wall of the cassette accommodating case and the stopper projection is engaged with a concave portion formed on the rear surface of the compact cassette of an erroneous erasure preventing click to thereby prevent the compact cassette from being freely drawn. In this case, since the stopper projection rubs the cassette when the cassette is inserted and drawn and hence the stopper projection becomes worn, it becomes impossible similarly as described above to prevent the cassette from being freely drawn.

The prevent invention is made to solve the above problems, and it is an object of the present invention to increase durability of the reel stopper pieces against deformation caused down when the cassette is inserted and drawn and hence the reel stopper pieces are pressed down and rise.

DISCLOSURE OF THE INVENTION

A cassette accommodating case according to the present invention is a cassette accommodating case having, at one case side surface, a cassette insertion opening where a cassette is slidably inserted and drawn and formed by integrating an upper half and a lower half and having a finger-insertion opening portion formed on an upper surface of the upper half so as to be oval in the case depth direction and used for drawing a cassette. A reel stopper member in which a pair of reel stopper pieces engaged with reel hub apertures of the cassette and capable of rising and being pressed down are planted from a base plate is fixed on a bottom surface of the lower half, and a traverse U-letter shaped slit groove is formed through the base plate portion where the reel stopper pieces are planted, thereby the base plate being formed to be a flexible base plate which is deformed flexibly.

Therefore, since the flexible base plate is simultaneously bent together with a rising and falling operation of the reel stopper piece, an applied stress can be dispersed. Hence, it is possible to improve durability with respect to the repeated rising and falling operation of the reel stopper piece.

A cassette accommodating case according to the present invention is a cassette accommodating case having, at one case side surface, a cassette insertion opening where a cassette is slidably inserted and drawn and formed by integrating an upper half and a lower half and having a finger-insertion opening portion formed on an upper surface of the upper half so as to be oval in the case depth direction and used for drawing a cassette. A cantilever-shaped cassette-release preventing member having an elastic function and engaged with a concave portion of a rear surface of the cassette is provided on an inner wall surface of the cassette housing on the opposite side of the cassette insertion opening.

Therefore, there can be achieved an effect of preventing the cassette from being released for a long period of time without both of the cassette and the cassette-release preventing member being abraded when the cassette is accommodated in the cassette accommodating case.

A cassette accommodating case according to the present invention is a cassette accommodating case having, at one case side surface, a cassette insertion opening where a cassette is slidably inserted and drawn and formed by integrating an upper half and a lower half and having a finger-insertion opening portion formed on an upper surface of the upper half so as to be oval in the case depth direction and used for drawing a cassette. A reel stopper member in which a pair of reel stopper pieces engaged with reel hub apertures of the cassette and capable of rising and being pressed down are planted from a base plate is fixed on a bottom surface of the lower half, and a traverse U-letter shaped slit groove is formed through the base plate portion where the reel stopper pieces are planted, thereby the base plate being formed to be a flexible base plate which is deformed flexibly. Moreover, a cantilever-shaped cassette-release preventing member having an elastic function and engaged with a concave portion of a rear surface of the cassette is provided on an inner wall surface of the cassette housing on the opposite side of the cassette insertion opening.

Therefore, it is possible to improve the durability with respect to the repeated rising and falling operation of the reel stopper piece, and an effect of preventing the cassette from being released can be achieved for a long period of time.

BRIEF DESCRIPTION OF DRAWINGS

FIG. 17 is a perspective view of the upper half seen from its rear surface with a portion where the rub occurs being shown by hatching;

FIG. 21 is a perspective view of a compact cassette;

FIG. 24 is a perspective view of another example of a conventional reel stopper member.

BEST MODE FOR CARRYING OUT THE INVENTION

An embodiment of a cassette accommodating case according to the present invention will be hereinafter be described by exemplifying an accommodating case for accommodating an audio compact cassette.

Figure 1:
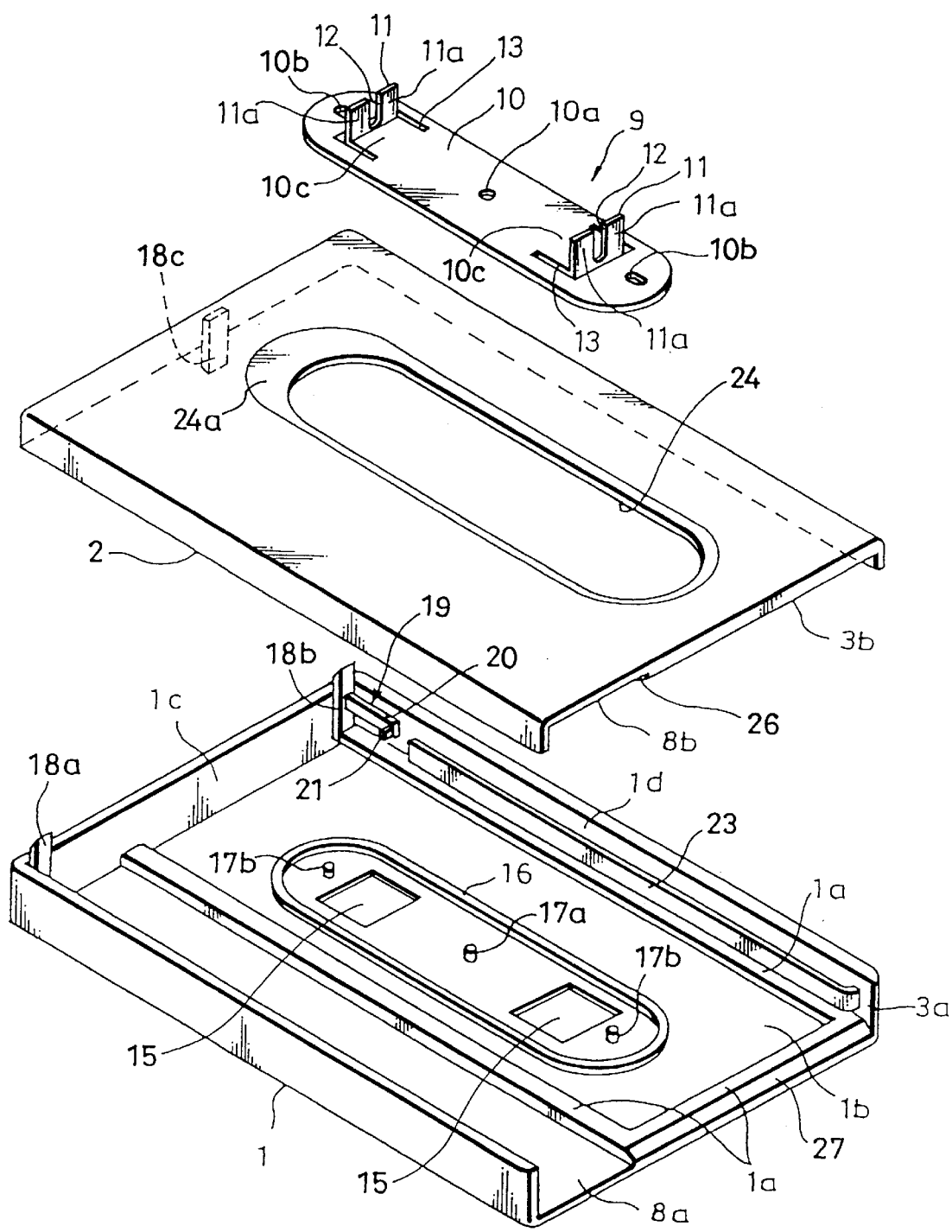
FIG. 1 is a perspective view of a main part of a cassette accommodating case according to the present invention in a separate state.
Figure 2:
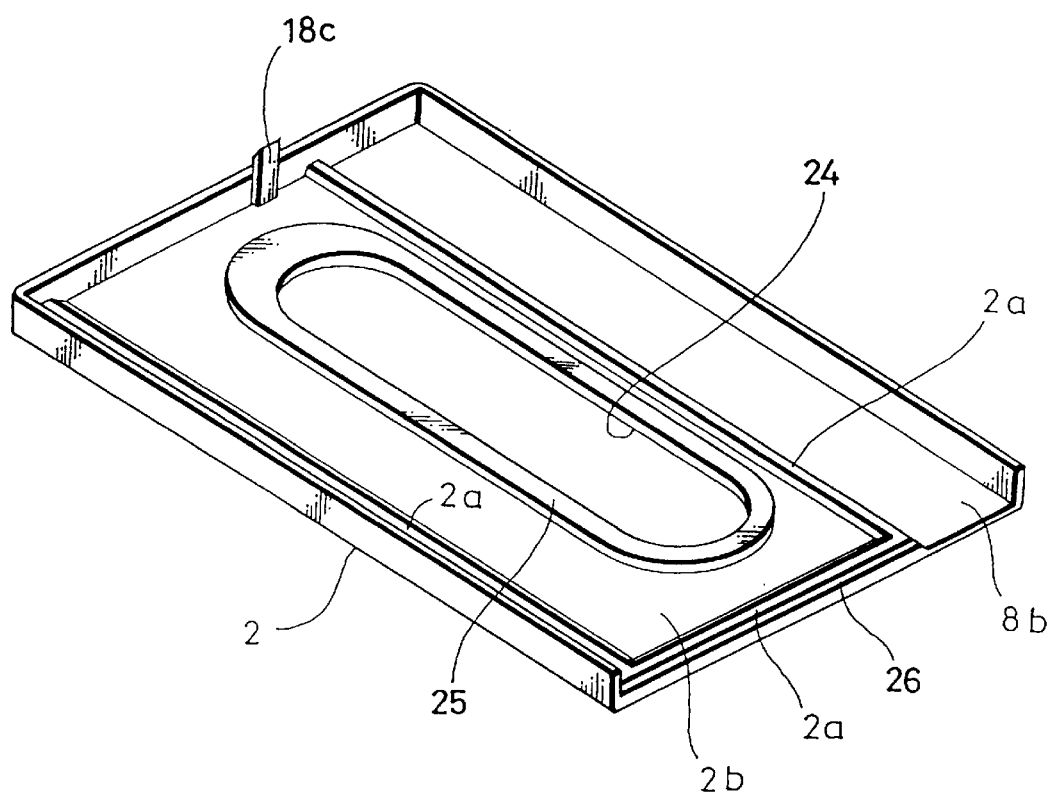
FIG. 2 is a perspective view of an upper half seen from its rear surface.

FIG. 1 is a perspective view of the cassette accommodating case with its main parts being separated. FIG. 2 is a perspective view of an upper half seen from its rear side.

Figure 3:
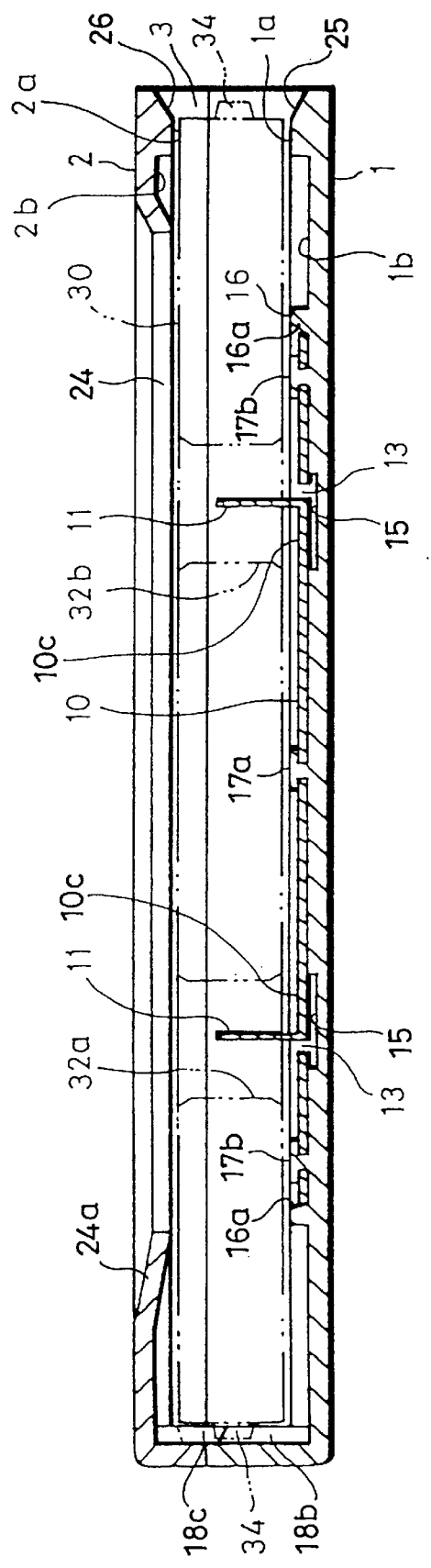
FIG. 3 is an enlarged view of a longitudinal cross section of the cassette accommodating case.
Figure 4:
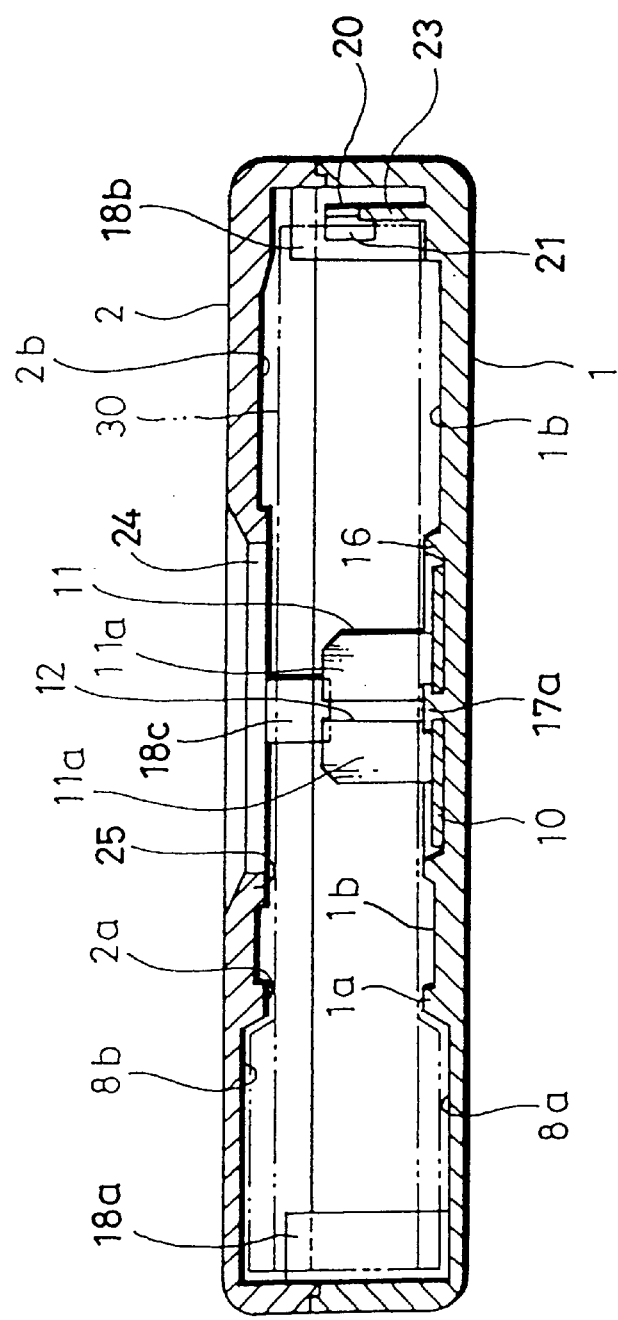
FIG. 4 is an enlarged view of a cross section of the same cassette accommodating case.

FIG. 3 is an enlarged view of longitudinal cross section of the cassette accommodating case in its assembled state. FIG. 4 is an enlarged view of cross section thereof.

The cassette accommodating case is formed by integrating a lower half 1 and an upper half 2. For example, the lower half 1 is molded out of plastic of HIPS (high impact polystyrene), and the upper half 2 is molded out of plastic of GPPS (general-purpose polystyrene).

Half cassette insertion openings 3a, 3b are formed at one side portions of the lower half 1 and the upper half 2, respectively. A compact cassette 30 shown in FIG. 21 is slidably inserted and drawn in the longitudinal direction thereof through a cassette insertion opening 3, shown in FIG. 3, formed by both of the halves 1, 2 jointed together. Therefore, the lower and upper halves 1, 2 have guide grooves 8a, 8b for guiding the projection portion 33 of the compact cassette 30 in the depth direction from the cassette insertion openings 3a, 3b, respectively.

Detailed Arrangement of Lower Half 1

The lower half 1 will be described initially. The lower half 1 has, at its bottom surface except the guide groove 8a, a thick portion 1a having a traverse U-letter frame shape and formed from a depth-direction side of the guide groove 8a to a cassette insertion opening 3a side and along a depth direction side of a side wall surface 1d. A thin porion 1b is formed on the bottom surface portion surrounded by the thick portion 1a, i.e., a so-called thickness reduction is carried out for that portion. For example, the thick portion 1a has a thickness of 2.4 mm, and the thin portion 1b has a thickness of 1.6 mm. In this case, the above guide groove 8a has a thickness of 0.8 mm. The thin portion 1b has substantially the same thickness as that of a wall surface of the lower half 1. Accordingly, the lower half 1 is rather thin but reinforced by the traverse U-letter shaped thick portion 1a.

An oval guide rib 16 which is long in the depth direction and used for positioning a reel stopper member 9 is integrally formed on the bottom surface formed of the above thin portion 1b. The guide rib 16 is formed so as to have a height equal to or lower than that of the thick portion 1a. The guide rib 16 has a tapered surface 16a on an inner periphery surface thereof. On the thin portion 1b surrounded by the guide rib 16, one caulking pin 17a is formed at its center and two caulking pins 17b, 17c are formed at both end sides.

Figure 7:
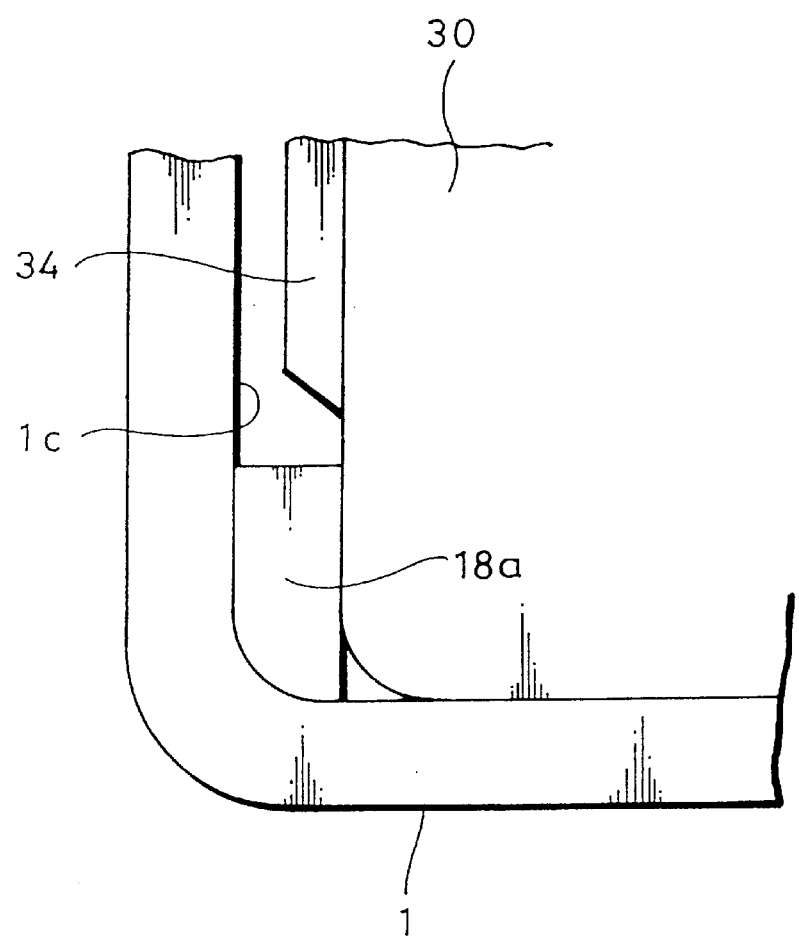
FIG. 7 is an enlarged view showing a relationship between a positioning piece and a guide projection.

The lower half 1 has positioning pieces 18a, 18b used when the lower half 1 is jointed with the upper half 2, at both corner portions of an innermost wall surface 1c thereof located at the opposite side of the cassette insertion opening 3a, the positioning pieces 18a, 18b being formed integrally so as to be projected from an upper edge of the lower half 1 and to have a tapered surface at each of the outsides of their tip end portions. The positioning pieces 18a, 18b also serve as a butt surface against a side end surface of the compact cassette 30 in its accommodated state. In order to prevent the guide projection 34 of the compact cassette 30 from being in contact with the innermost wall surface 1c in the butted state of the compact cassette, the positioning pieces 18a, 18b are made thick to thereby protect the guide projection 34 (see FIG. 7).

Therefore, strength of the innermost wall surface 1c can be improved as compared with an arrangement in which the innermost wall surface 1c is made thin to prevent the guide projection 34 from being in contact with the innermost wall surface 1c.

Arrangement of Reel Stopper Member 9

Figure 5:
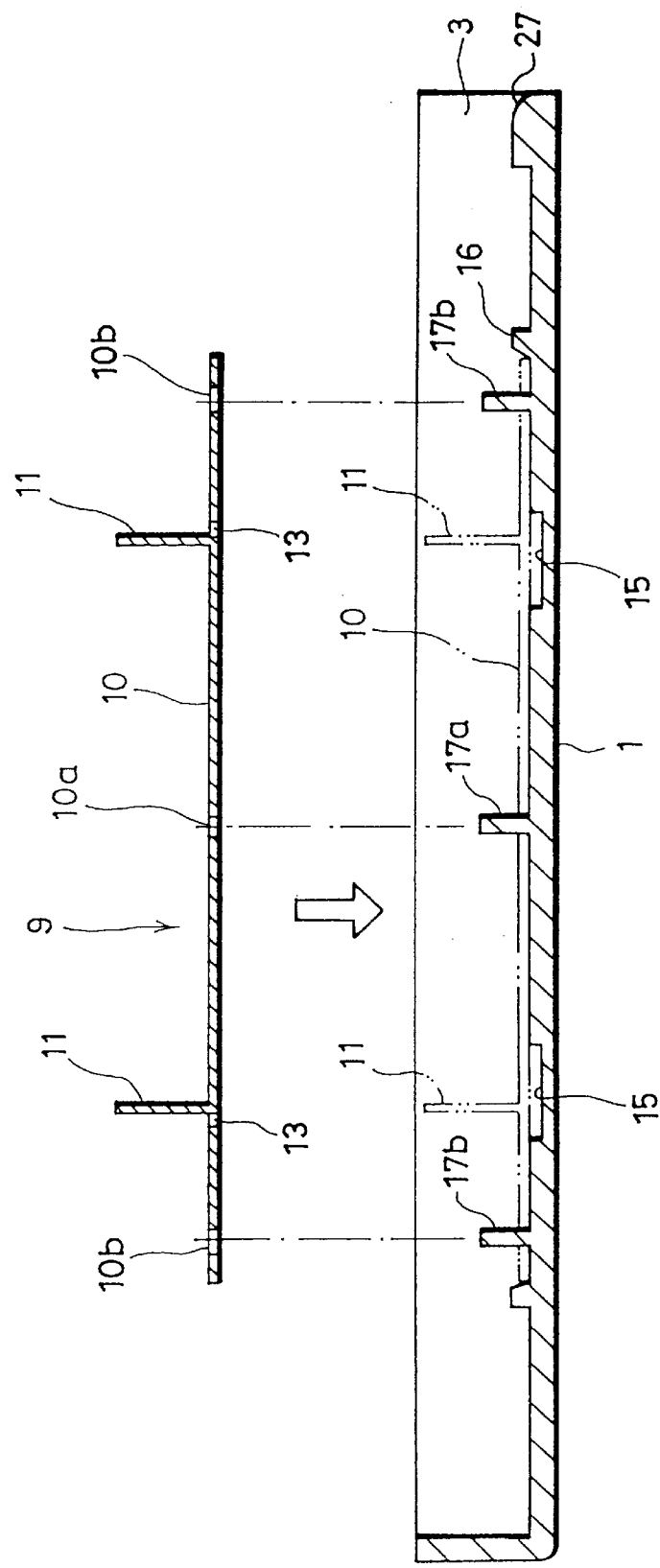
FIG. 5 is a cross-sectional view of a lower half and a reel stopper member with being separated.

The reel stopper member 9 is formed of a plastic product molded out of PP (polypropylene). As shown in FIG. 5, the reel stopper member 9 has one caulking and fixing aperture 10a formed of a circular aperture at the center of a base plate 10 so as to correspond to the above caulking pin 17a, and two caulking and fixing apertures 10b, 10b formed of long apertures at both end portions of the base plate 10 so as to correspond to the caulking pins 17b, 17b, respectively. The caulking and fixing apertures 10b, 10b are formed as long apertures extended outward from aperture positions thereof defined in view of design so as to correspond to the caulking pins 17b, 17b. A pair of tab-shaped reel stopper pieces 11, 11 which are made thinner than the base plate 10 can be raised and pressed down by their elasticity are planted on the base plate 10. These reel stopper pieces 11, 11 are inserted into and engaged with reel hub apertures 32a, 32b of the compact cassette 30, thereby the reels being prevented from being rotated. The reel stopper pieces 11, 11 are positioned at positions slightly shifted toward the cassette insertion opening 3 with reference to the aperture centers of the reel hub apertures 32a, 32b of the compact cassette 30 (see FIG. 6). Each of the reel stopper pieces 11 has at its center portion a notch portion 12 extended from its tip end portion to its root portion, i.e., extended to reach the base plate 10. Therefore, each of the reel stopper pieces 11 is formed of rotation stopper piece portions 11a, 11a having narrow stripe shapes and separated in the left and right directions.

Traverse U-letter shaped slits 13 are formed in the base plate 10 of the reel stopper member 9 so as to be adjacent to the reel stopper pieces 11, 11 from the outsides thereof. These slits allow one portions of the base plate 10 to serve as flexible base plates 10c, 10c which can flexibly be deformed in the vertical direction and also allow the reel stopper pieces 11, 11 to be planted from the end portions of the flexible base plates 10c, 10c. Concave portions 15, 15 are formed on the bottom surface of the lower half 1 at its portions corresponding to the flexible base plates 10c, 10c.

Arrangement of Cassette Release Preventing Member

A cassette-release preventing member 19 is provided in the lower half 1 on the side of the other positioning piece 18b. The cassette-release preventing member 19 has a cassette-release preventing piece 20 integrally formed therewith in a parallel to the side wall surface 1d in a state that the cassette-release preventing piece 20 is fixed on the positioning piece 18b in a cantilever fashion. The cassette-release preventing piece 20 has, at its tip end portion, a release preventing convex position 21 projected toward the inside of the lower half. The release preventing convex portion 21 is engaged with a recess portion 22a (see FIG. 8) formed, at the front of the erroneous erasure preventing click 22 provided at the rear surface of the compact cassette 30 in a state that it is accommodated in the cassette accommodating case, so as to be lower as compared with the rear surface of the compact cassette. Reference numeral 23 depicts a cassette guide piece provided along the side wall surface 1d on a plane substantially in parallel to the release preventing piece 20.

Arrangement of Upper Half

Figure 9:
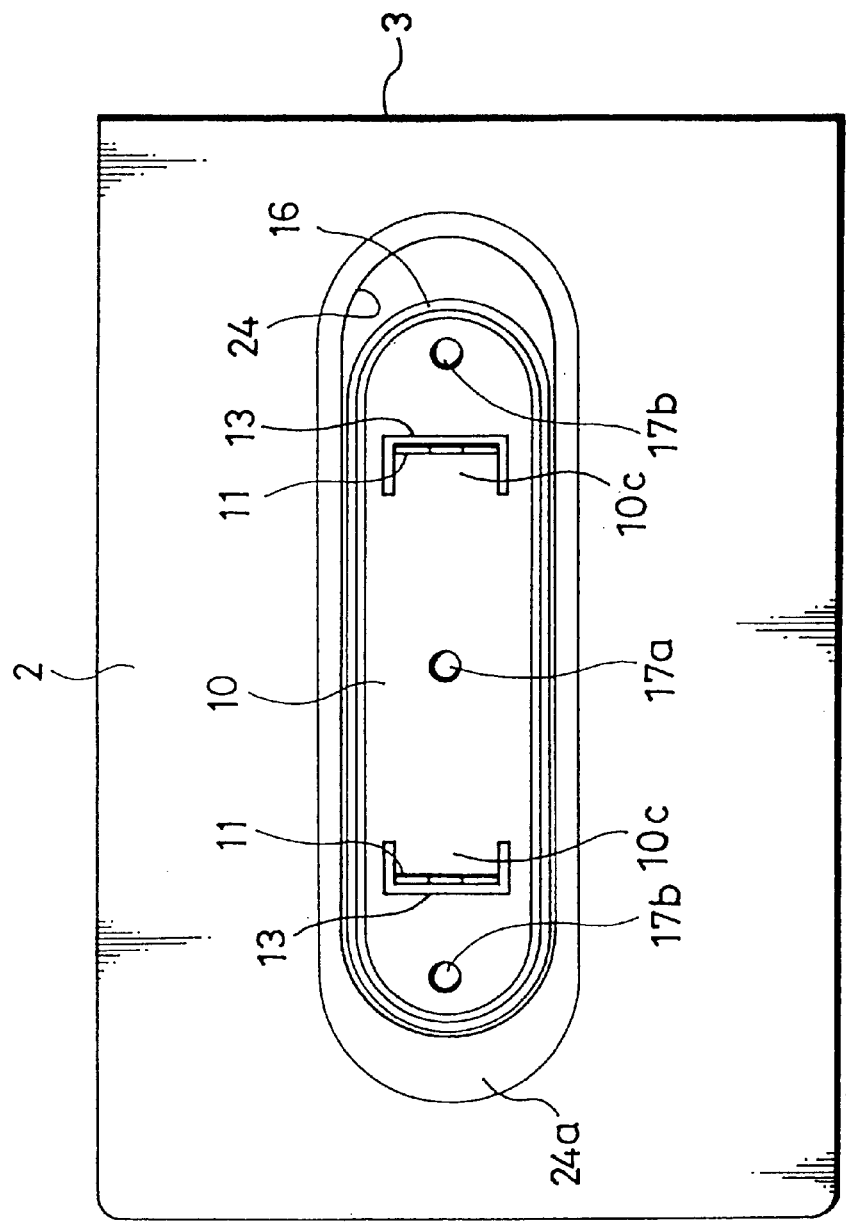
FIG. 9 is a plan view of the cassette accommodating case.

The upper half 2 has an oval finger-insertion opening portion 24 formed long in its depth direction. The finger-insertion opening 24 corresponds to a portion above the guide rib 16 formed on the bottom surface of the lower half 1. The reel stopper member 9 can be inserted through the finger-insertion opening portion 24 with the surface of the base plate 10 being in parallel to the bottom surface of the lower half. Therefore, as shown in FIG. 9, the finger-insertion opening portion 24 has a size larger than the shape of the base plate 10 and also equal to or larger than an inner periphery portion of the guide rib 16. The finger-insertion opening portion 24 has a gentle slope surface 24a formed at its opening edge on the side opposite to the cassette insertion opening 3 (see FIG. 3).

As shown in FIG. 2, the upper half 2 has, at its half surface portion except the guide groove 8b, a thick portion 2a having a traverse U-letter frame shape and formed along a depth-direction side of the guide groove 8b, a cassette insertion opening 3b side and a depth direction side of a side wall surface. A thin porion 2b is formed at a bottom surface portion surrounded by the thick portion 1a, i.e., a so-called thickness reduction is carried out for that portion. For example, the thick portion 2a has a thickness of 2.4 mm, and the thin portion 2b has a thickness of 1.6 mm. In this case, the above guide groove 8b has a thickness of 0.8 mm. The thin portion 2b has substantially the same thickness as that of a wall surface of the upper half 2. Accordingly, the upper half 2 is rather thin as a whole but reinforced by the traverse U-letter shaped thick portion 2a. Moreover, a reinforce rib 25 is formed at the surrounding portion of a rear surface of the finger-insertion opening portion 24 of the upper half 2.

The upper half 2 has a positioning piece 18c integrally, used for jointing the upper half and the lower half 1, formed at the center portion of its innermost wall surface so as to be projected downward from a lower edge of the upper half 2. The positioning piece 18c has a tapered surface at the outside of its tip end portion.

The upper half 2 has an inclined surface 26 formed at an inner edge portion of the thick portion 2a on the side of the cassette insertion opening 3b except the guide groove 8b. Similarly, the lower half 1 has an inclined surface 27 at an inner edge portion of the thick portion 1a on the cassette insertion opening 3a except the guide groove 8a. Therefore, when the cassette accommodating case is formed by jointing the lower and upper halves 1, 2 as shown in FIG. 3, the upper and lower opening portions of the cassette insertion opening 3 are set as a wide opening by the inclined surfaces 26, 27.

Assembly of Cassette Accommodating Case

When both of the halves 1, 2 are jointed together by using the two positioning pieces 18a, 18b of the lower half 1 and the positioning piece 18c of the upper half 2, the edge portions of both of the halves 1, 2 are introduced by tapered surfaces of the tip end portions of the positioning pieces 18a, 18b and 18c, which allows both of the halves to be jointed together at the precise positions. In a state that both of the halves 1, 2 are jointed together, the positioning pieces 18a, 18b of the lower half 1 and the positioning piece 18c of the upper half 2 allow both of the halves 1, 2 to be engaged with each other. Therefore, even when both of the halves are conveyed for the next process while being jointed together, both of the halves 1, 2 are prevented from being positionally displaced.

Thus, both of the halves 1, 2 are welded by ultrasonic wave at their joint surfaces, thereby the integrated cassette accommodating case being formed. When the reel stopper member 9 is fixed on the bottom surface of the lower half 1, there may be employed either of a method in which, before both of the halves 1, 2 are jointed together, the caulking and fixing apertures 10a, 10b, 10c of the base plate 10 of the reel stopper member 9 are respectively engaged with the three caulking pins 17a, 17b and 17b of the lower half 1 and positioned and the base plate is caulked and fixed by using ultrasonic wave, and a method in which, after both of the halves 1, 2 are jointed together, the reel stopper member 9 is inserted through the finger-insertion opening portion 24 of the upper half 2, the caulking and fixing apertures 10a, 10b, 10b of the base plate 10 of the reel stopper member 9 are respectively engaged with the three caulking pins 17a, 17b and 17b of the lower half 1 and positioned and the base plate is caulked and fixed by using ultrasonic wave. When the latter method is employed, it is advantageously possible to improve efficiency in assembly of the cassette accommodating case.

Since the caulking and fixing apertures 10b, 10b at the both end portions of the reel stopper member 9 are made oval apertures extended outward with reference to the aperture positions set in view of design so as to correspond too the caulking pins 17b, 17b, even if the thermal shrinkage occurs after the reel stopper member 9 is molded, the caulking and fixing apertures 10b, 10b can be precisely engaged with the caulking pins 17b, 17b, which can improve efficiency in assembly of the reel stopper member 9.

Subsequently, an operation of accommodating a compact cassette in the cassette accommodating case according to the present invention will be described.

Function of Reel Stopper Member Upon Accommodation of Cassette

When the compact cassette 30 is inserted through the cassette insertion opening 3 with the trapezoid projection portion 33 respectively corresponding to the guide grooves 8a, 8b, the reel stopper pieces 11, 11 of the reel stopper member 9 are elastically deformed and pressed down because of insertion of the cassette. However, when the cassette is inserted up to the innermost, the reel stopper pieces 11, 11 respectively correspond to the reel hub apertures 32a, 32a of the cassette. Therefore, the reel stopper pieces 11, 11 rise by their elastic forces and hence are engaged with the reel hub apertures 32a, 32a. The reel stopper pieces are further engaged with projections 32c, 32c projected from periphery surfaces of the hub apertures, thereby the reels being prevented from being rotated. This state is a state that the compact cassette 30 is completely accommodated in the cassette accommodating case (see FIG. 6).

Figure 10:
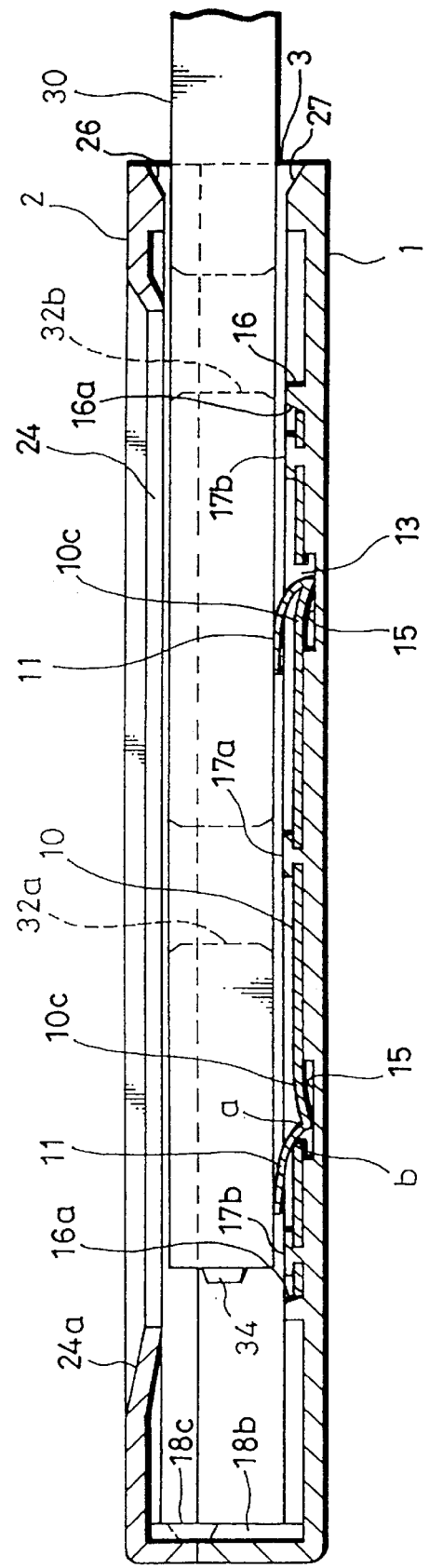
FIG. 10 is an enlarged view of a longitudinal cross section of the cassette accommodating case in a state that the compact cassette is being accommodated therein.

The rising and falling operations of the above reel stopper pieces 11, 11 will be described in detail further. When the compact cassette 30 is inserted into the cassette accommodating case to press the reel stopper pieces 11, 11 down in the cassette insertion direction, as shown in FIG. 10, in the reel stopper piece 11 on the inner side of the cassette accommodating case, the flexible base plate 10c is bent toward the concave portion 15 and a part of the reel stopper piece 11 is brought in contact with the end surface of the base plate 10 faced to the slit groove 13, thereby being elastically deformed. Specifically, a load stress applied to the reel stopper piece 11 can be dispersed to a first fulcrum a at the root portion relative to the flexible base plate 10c and a second fulcrum b at a portion in contact with the end surface of the base plate 10. Therefore, a fatigue in elasticity applied to the root portion, which tends to be damaged particularly, of the reel stopper piece 11, and hence it is possible to improve the durability with respect to the repeated rising and falling operations thereof.

The flexible base plate 10c is bent toward the concave portion 15, and the reel stopper piece 11 on the side of the cassette insertion opening 3 of the cassette accommodating case is elastically deformed at its root portion with respect to the flexible base plate 10c. In this case, since the flexible base plate 10c is bent toward the concave portion 15 side and hence an inclination angle of the reel stopper piece 11 becomes gentle, a stress applied to the root portion of the reel stopper piece is reduced and it is possible to reduce fatigue in elasticity and to improve durability with respect to repeated operations of rising and being pressed down.

It is needless to say that even if the concave portions 15, 15 corresponding to the flexible base plates 10c, 10c are not formed at the bottom surface of the lower half 1, not only since the reel stopper pieces 11, 11 are elastically deformed but also since the flexible base plates 10c, 10c are simultaneously bent, a deformation load force applied to the reel stopper piece is dispersed and hence it is possible to improve the durability with respect to repeated operations of rising and being pressed down.

Figure 6:
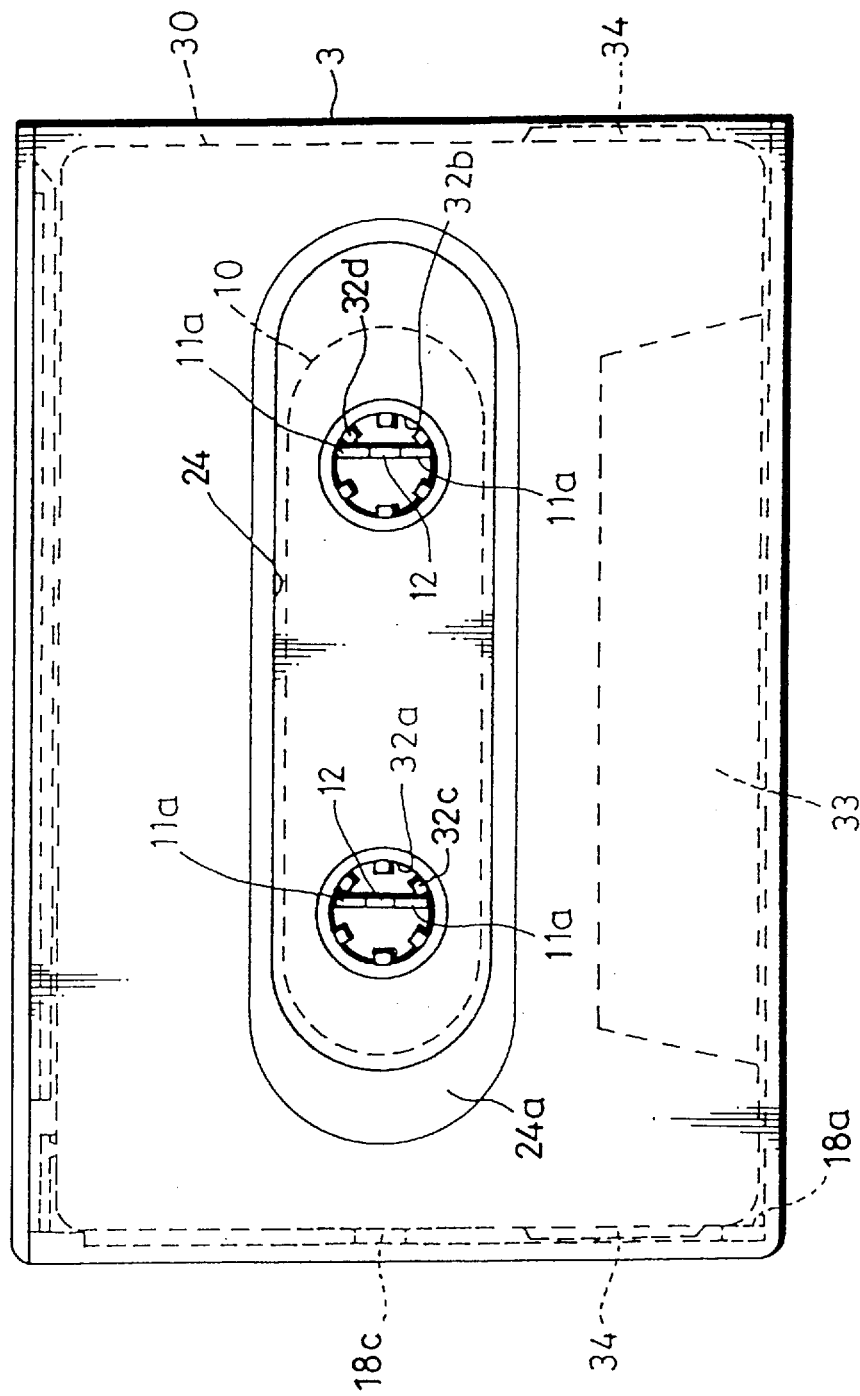
FIG. 6 is a plan view of the cassette accommodating case in which a compact case is accommodated.

As shown in FIG. 6, since the reel stopper pieces 11, 11 can be engaged with the reel hub apertures 32a, 32a at the positions displaced toward the cassette insertion opening 3, it is possible to set widths of the reel stopper pieces 11, 11 shorter as compared with the aperture diameters of the center of the reel hub apertures 32a, 32a. Specifically, it is possible to engage the reel stopper pieces 11, 11 with the reel hub apertures 32a, 32a because the reel stopper pieces pressed down due to insertion of the compact cassette 30 easily rise without being prevented from rising by the edge portions of the reel hub apertures. Therefore, it is also possible to release the reel stopper pieces 11, 11 from the reel hub apertures 32a, 32a when the compact cassette is drawn.

Function of Cassette-Release Preventing Member 19

Figure 8:
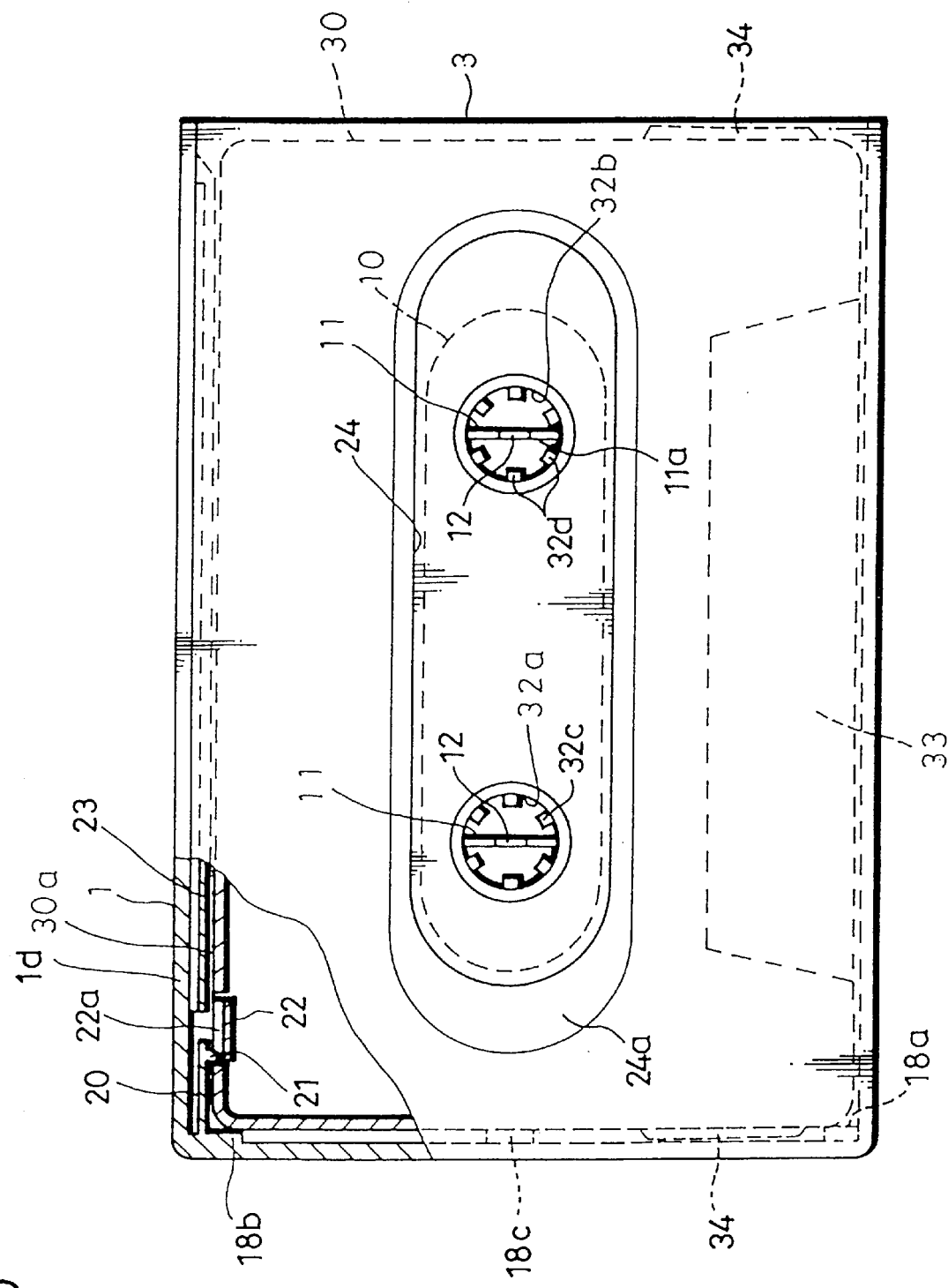
FIG. 8 is a plan view of the cassette accommodating case, showing a cross section used to explain a state that a release preventing member and the compact cassette are engaged with each other.

When the compact cassette 30 is inserted, the compact cassette is inserted with a rear surface 30a thereof being guided by the cassette guide piece 23. Immediately before the cassette is accommodated, the cassette rear surface 30a is brought in contact with the release preventing convex portion 21 of the cassette-release preventing member 19 and hence the cassette-release preventing piece 20 is elastically deformed and bent toward the wall surface. Thereafter, in the cassette accommodated state, as shown in FIG. 8, the release preventing convex portion 21 can be engaged with the recess portion 22a formed at the front portion of the erroneous-erasure preventing click 22 so as to lower as compared with the rear surface. Therefore, the compact cassette 30 is held in its accommodated state, and it is possible to prevent the cassette from being drawn even when the cassette accommodating case is fluctuated and applied with shock.

Specifically, it is possible to stably accommodate the compact cassette 30 in its accommodated state in the cassette accommodating case without holding the cassette unsteadily, due to both a function of the reel stopper member 9 to prevent rotation of the reels and a function of the cassette-release preventing member 19 to prevent the cassette from being drawn.

Specifically, since the cassette-release preventing member 19 is provided in a cantilever fashion at the corner portion of the innermost wall surface 1c on the side opposite to the cassette insertion opening 3, when the compact cassette 30 is deeply inserted into the cassette accommodating case, the release preventing convex portion 21 is engaged with the recess portion 22a formed at the erroneous-erasure preventing click 22 so as to be lower as compared with its surrounding portion. Therefore, an external force to be applied to the cassette-release preventing member 19 when the cassette 30 is inserted is instantaneously produced only, and hence it is possible to keep the durability for a long period of time without lowering the strength of the cassette-release preventing member 19.

Since friction between the compact cassette 30 and the cassette-release preventing member 19 seldom produces shavings, no influence is given to a magnetic tape in the cassette.

Since it is necessary to newly form a special engagement portion of the compact cassette side engaged with the cassette-release preventing member 19 and the recess portion 22a of the erroneous-erasure preventing click 22 can be employed as the engagement portion, it is possible to employ the existing compact cassette as it is.

Moreover, since the cassette-release preventing member 19 can be molded only by adding a core block of the portion to a mold die for the lower half 1, it is possible to employ the exiting die as it is.

Since the cassette insertion opening 3 into which the compact cassette 30 is inserted is formed so as to be a wide opening by respectively forming the inclination surfaces 26, 27 at the opening edges 3a, 3b of the lower and upper halves, even if the compact cassette 30 is inserted in a state that it is slightly inclined vertically relative to the cassette insertion opening 3, then the cassette-insertion side end portion of the cassette is introduced by the inclined surfaces 26, 27 to the cassette insertion opening 3 and hence the cassette is set naturally in a horizontal posture. As a result, it is possible to insert the cassette smoothly. Therefore, it is possible to prevent an extra force from being applied to the cassette accommodating case when the cassette is inserted, and hence it is possible to prevent the cassette accommodating case from being damaged and also to prevent the cassette from being damaged.

Drawing of Compact Cassette from Cassette Accommodating Case

When the compact cassette 30 is drawn from the cassette accommodating case, a thumb is put on the slope surface 24a of the finger-insertion opening portion 24. The compact cassette 30 is pushed toward the cassette insertion opening 3 with the reel hub aperture 32a of the cassette being hooked by the finger. Thus, the reel stopper pieces 11, 11 are pressed down by the reel hub apertures 32a, 32b and hence are released therefrom. Thereafter, the cassette projected from the cassette insertion opening 3 is pulled out with the cassette being gripped by the fingers, and hence the cassette can be drawn. Thus, it is possible to draw the compact cassette with reliability and satisfactory operability, and also to improve a design of an appearance of the cassette accommodating case.

Function of Reel Stopper Member Upon Drawing of Cassette

When the reel stopper pieces 11, 11 are released from the reel hub apertures 32a, 32a, load stresses applied to the two reel stopper pieces 11, 11 are opposite to those received upon the insertion of the cassette. Therefore, the fatigue in elasticity is seldom applied to the reel stopper pieces 11, 11.

Figure 11:
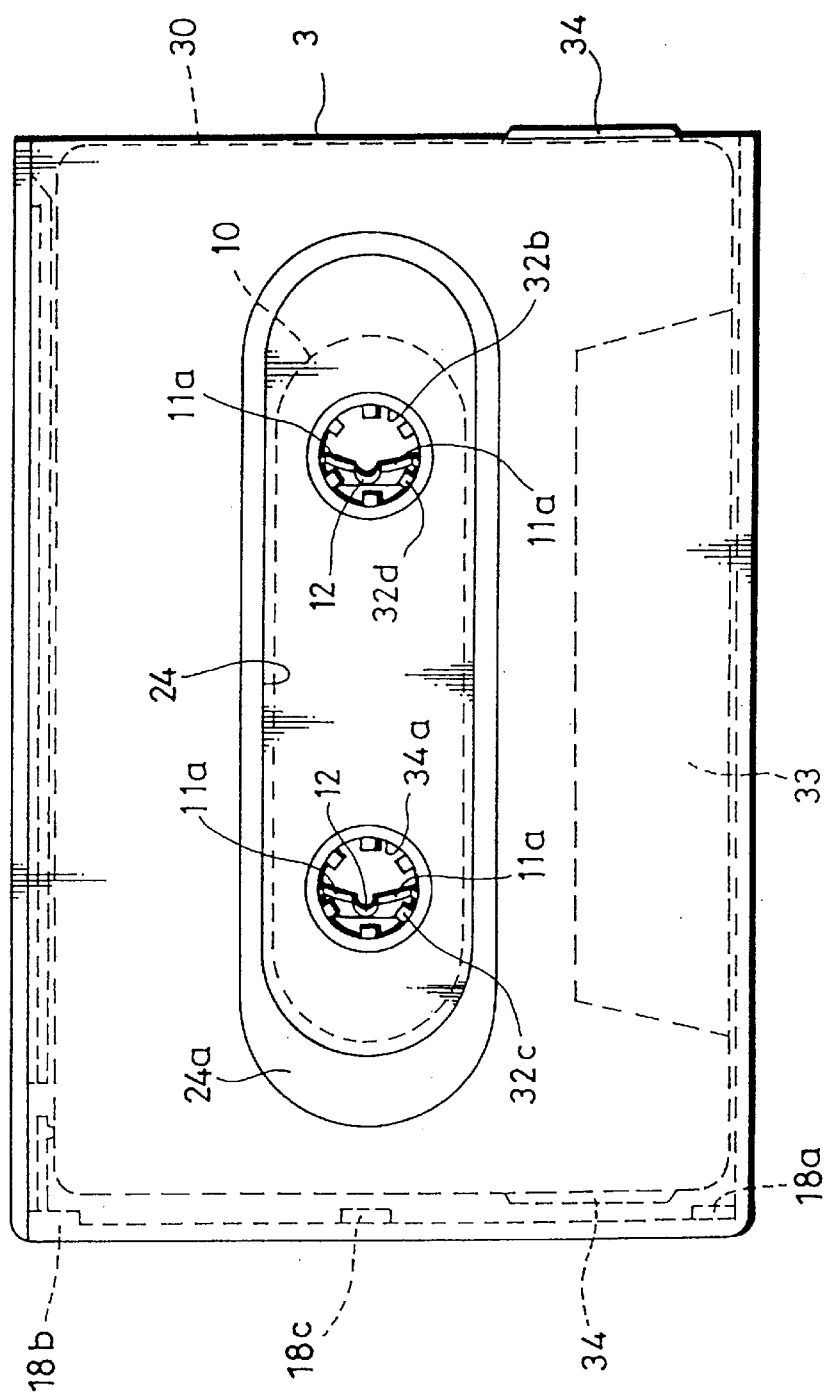
FIG. 11 is a plan view of the cassette accommodating case in a state that the compact cassette starts being drawn therefrom.

An operation for the reel hub aperture 32a to be released from the reel stopper piece 11 will be described by exemplifying the one reel hub aperture 32a with reference to FIG. 6 and FIG. 11. When the cassette 30 is released from a state shown in FIG. 6 that the reel stopper piece 11 is engaged with the reel hub aperture 32a, the rotation stopper piece portions 11a, 11a of the reel stopper piece 11 are pushed by the projections 32c of the reel hub aperture 32a as shown in FIG. 11, deformed in a substantially V-letter shape, and thereafter pressed down. Specifically, since the rotation stopper portions 11a, 11a are bent in a V-letter shape, the width of the upper end side of the reel stopper piece 11 becomes narrow. As a result, the reel stopper piece 11 can smoothly be released from the reel hub aperture 32a.

During the cassette drawing operation, the reel hub aperture 32a is temporarily engaged with the reel stopper piece 11 on the cassette insertion opening 3 side. However, since the cassette is being drawn and moved, the reel hub aperture 32a instantaneously presses the reel stopper piece 11 down and passes. Then, after the compact cassette 30 is drawn, the reel stopper pieces 11, 11 rise again by their own elastic restoring forces.

Feature portions of the lower and upper \halves 1, 2 will be described.

Specifically, the features of the lower and upper halves 1, 2 are that their portions except the traverse U-letter frame shaped thick portions 1a, 2a are molded as the thin portions 1b, 2b as described above.

Since a wide area portion forming the bottom portion of the lower half 1 is formed of the thin guide groove 8a and the thin portion 1b which is thick as compared with the groove portion but made thin, the thickness of the lower half is seldom fluctuated and made substantially even. As a result, when the lower half 1 is injection-molded, resin satisfactorily flow into a die cavity, which can almost prevent any sink mark from occurring. Since the lower half 1 has the traverse U-letter shaped thick portion 1a provided at the bottom portion except the guide groove 8a and from its depth-direction side of the guide groove 8a to the cassette insertion opening side, the total strength of the lower half 1 can be reinforced. In particular, since the portion of the cassette insertion opening 3a is reinforced by the thick portion 1a, the strength of the cassette insertion opening portion can be increased, and hence a shape of the insertion opening can be kept. Since the thick portion 1a has a shape of a frame with a narrow width, any sink mark seldom occurs at the thick portion 1a.

Further, since the guide rib 16 for the reel stopper member 9 is molded at the bottom center portion formed of the thin portion 1b of the lower half 1, the guide rib 16 can also serve to reinforce the thin portion 1b, which can prevent the lower half bottom surface from being bent by an external force.

On the other hand, since a wide area portion forming the bottom portion of the upper half 2 is formed of the thin guide groove 8b and the thin portion 2b which is thick as compared with the groove portion but made thin, the thickness of the upper half is seldom fluctuated and made substantially even. As a result, when the upper half 2 is injection-molded, resin satisfactorily flow into a die cavity, which can almost prevent any sink mark from occurring. Since the upper half 2 has the traverse U-letter shaped thick portion 2a provided at the bottom portion except the guide groove 8b and from its depth-direction side of the guide groove 8b to the cassette insertion opening side 3b, the total strength of the upper half 2 can be reinforced. In particular, since the portion of the cassette insertion opening 3b is reinforced by the thick portion 2a, the strength of the cassette insertion opening portion can be increased, and hence a shape of the insertion opening can be kept.

Since the finger-insertion opening portion 24 on the upper surface of the upper half 2 is formed in the thin portion 2b but the reinforce rib 25 is formed at the periphery of the rear surface of the finger-insertion opening portion 24, it is possible to reinforce the finger-insertion opening portion 24 and to prevent the upper surface of the upper half 2 from being bent by an external force.

As described above, according to the cassette accommodating case of the present invention, it is possible to avoid the sink mark caused when the upper and lower halves are molded. Therefore, it is possible to avoid deformation of the shape and to prevent the dimension from being not precise. Moreover, there can be achieved an effect in which the cassette accommodating case is hardly bent by an external force.

Moreover, since the cassette accommodating case can be made thinner, a consumption amount of a plastic material can be reduced, which leads to reduction in manufacturing costs of molded products.

Another Embodiment of Slit Groove

Figure 12:
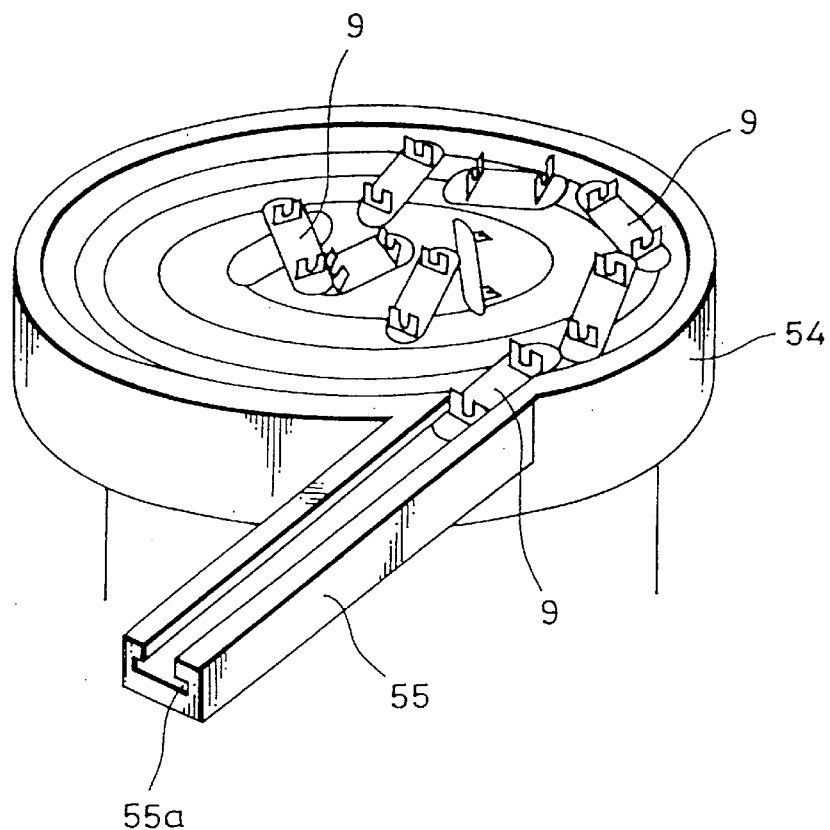
FIG. 12 is a perspective view of a part feeder which is supplying the reel stopper member.

As shown in FIG. 12, the reel stopper members 9 are housed in a vibrating part feeder 54 in a bulk fashion. The reel stopper members 9 are conveyed therefrom one by one in a state that they are engaged with a guide groove 55a of a straight shooter 55, thereby being automatically supplied to the guide rib 16 of the lower half 1.

Figure 13:
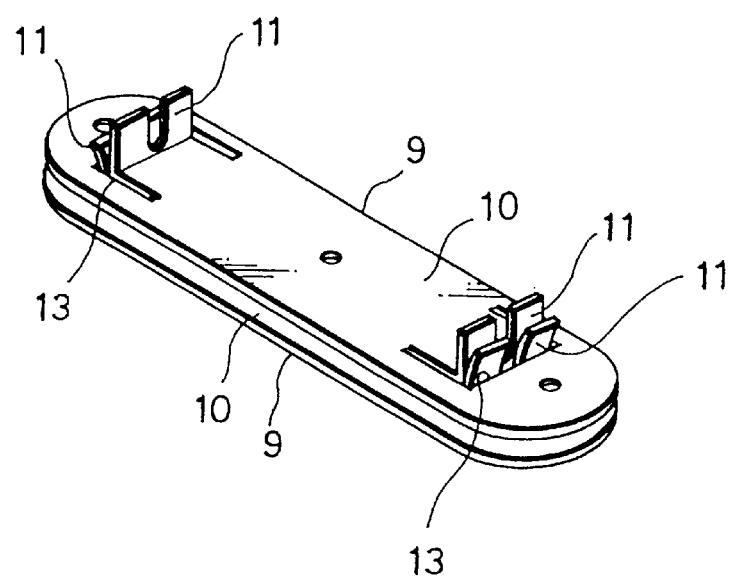
FIG. 13 is a perspective view showing an desired state of the reel stopper members overlapped each other.

However, the reel stopper member 9 is sometimes inserted at its slit groove 13 with the reel stopper piece 11 of another reel stopper member 9 by the vibration of the part feeder 54. The reason for the cause of this state is, for example, that the slit groove 13 is a straight groove which facilitates insertion of the another reel stopper piece 11 thereinto. In particular, another reel stopper 11 is easily inserted into the slit groove 13 on the rear surface side of the reel stopper piece 11. At worst, as shown in FIG. 13, two reel stopper members 9, 9 are overlapped each other. For example, one method of avoiding the above problem is to make a gap of the slit groove 13 narrow as compared with the thickness of the reel stopper piece 11 to thereby prevent the reel stopper piece 11 from being inserted into the slit groove 13 of another one. However, the method is not a decisive countermeasure because the reel stopper piece of the reel stopper member is gradually inserted into the slit groove of another one by vibration of the part feeder 54 and so on.

If such reel stopper members 9 overlapped each other are produced, then it becomes difficult for them to pass through the straight shooter 55. Therefore, the reel stopper members chokes the straight shooter at its inlet side, and thereafter supply of the reel stopper members is stopped, which stops a production line for the assembly. Because of this fact, a worker for monitoring the part feeder 54 is required under the present situation.

Figure 14:
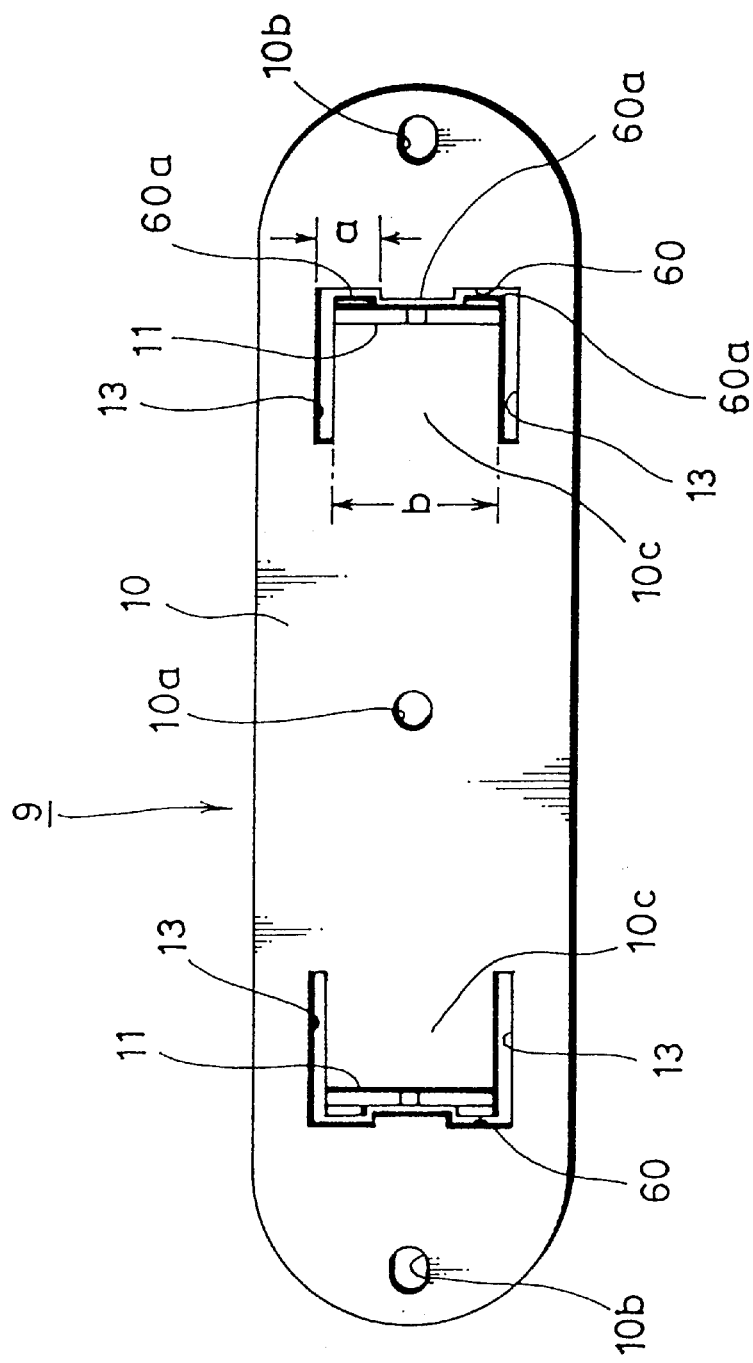
FIG. 14 is a plan view of the reel stopper member in which a slit groove is formed as a crank-shaped bent groove.

According to the present invention, to provide the countermeasure for preventing the reel stopper members from being overlapped each other in the part feeder 54, as shown in FIG. 14, the slit groove 13 of a traverse U-letter shape on the rear surface side of the reel stopper piece 11 is formed as, for example, a bent groove 60 having a crank shape, which can solve the above problem. It is natural that a length a of each of straight portions of the bent groove 60 is substantially one-thirds as long as a width b of the reel stopper piece 11. Therefore, even if such an external force is applied that the straight reel stopper piece 11 is forcibly inserted into the bent groove 60 of an other reel stopper member 9, then the reel stopper piece is brought in contact with projecting piece portions 60a and hence prevented from being inserted into the cranked groove.

Since the slit groove 13 is formed so as to have a traverse U-letter shape, it is sometimes observed that another reel stopper piece 11 is inserted into the slit groove 13 on the side surface side of the reel stopper piece 11. Therefore, if a cranked slit groove similarly as described above is formed at the side surface side slit groove, then it becomes a complete countermeasure for preventing such insertion.

Figure 15A:
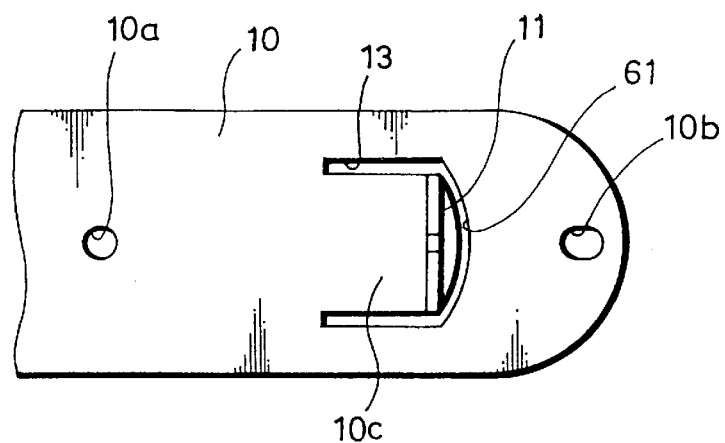
FIG. 15A is a plan view of the bent groove of another example.
Figure 15B:
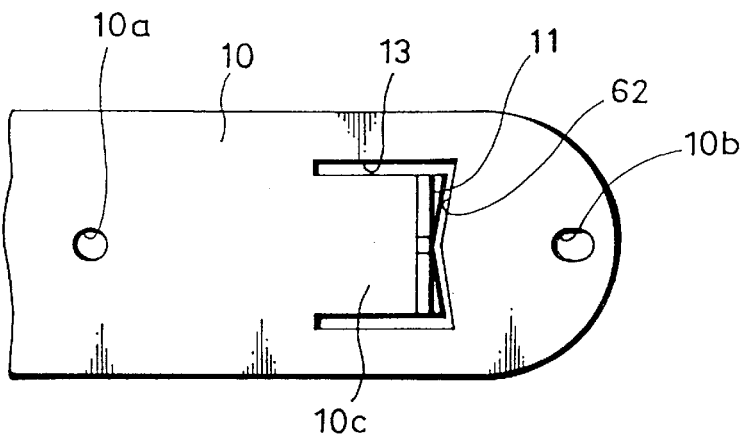
FIG. 15B is a plan view of the bent groove of further another groove.

While the bent groove 60 having a cranked shape has been described, other than this bent groove, an arc-shaped bent groove 61 shown in FIG. 15A or a bent groove 62 shown in FIG. 15B may be formed to prevent the reel stopper piece from being inserted similarly.

As described above, since the slit groove is formed as the bent groove and hence it is possible to effectively prevent the reel stopper members 9 from being overlapped each other in the part feeder 54, it is possible to smoothly supply the reel stopper members from the part feeder 54 to the straight shooter 55, which does not disturb the production line of the assembly. Therefore, a worker for monitoring the part feeder 54 is not required.

Another Embodiment of Thick Portion 2a of Upper Half

Figure 16:
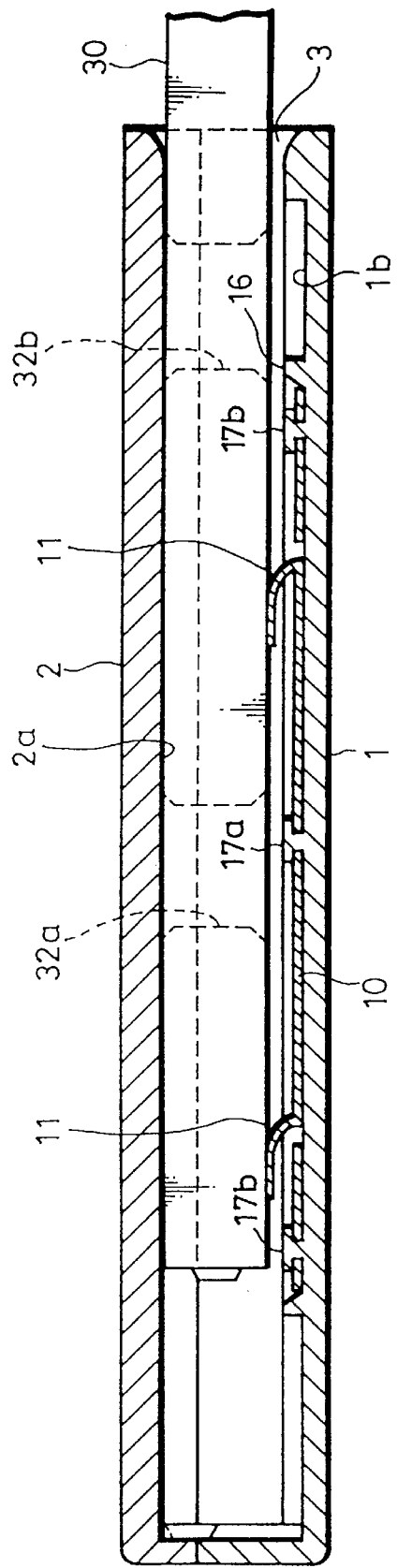
FIG. 16 is a cross-sectional view of the cassette accommodating case showing a state that an upper half is rubbed when the compact cassette is accommodated.

When the compact cassette 30 is inserted through the cassette insertion opening 3 into the above cassette accommodating case, the reel stopper pieces 11 of the reel stopper member 9 are elastically deformed and pressed down as shown in FIG. 16. At this time, the compact cassette 30 is inserted with being raised toward the upper half 2 by the elastic returning force of the reel stopper piece 11. At this time, a cassette upper surface on the opposite side of the projection portion 33 of the compact cassette 30 rubs the thick portion 2a, shown by hatching in FIG. 17, on the case side surface for also serving to prevent the unsteady state of the cassette. In particular, such rub is frequently caused when the thick portion 2a scratches the edge portion of the tip end portion of the compact cassette 30. Then, this rub is caused every time when the compact cassette is inserted or drawn, which produces scratches on both of the cassette and case and also produces shavings. Therefore, the function and the property as a product are damaged.

Since the thick portion 2a on the side surface side is long in width as compared with the thick portion 2a on the side of the guide groove 8b and is thicker than the thin portion 2b, a sink mark is produced on a border portion between them when the upper half 2 is injection molded. In particular, when a gate for supplying resin upon the molding of the upper half 2 is located outside of the case with respect to the thick portion 2a, a large sink mark is formed on the thick portion 2a and the case portion in the vicinity of the gate G shown by a broken line in FIG. 17. Since this sink mark can easily be recognized from the surface of the molded product, the value as the product is damaged.

Figure 18:
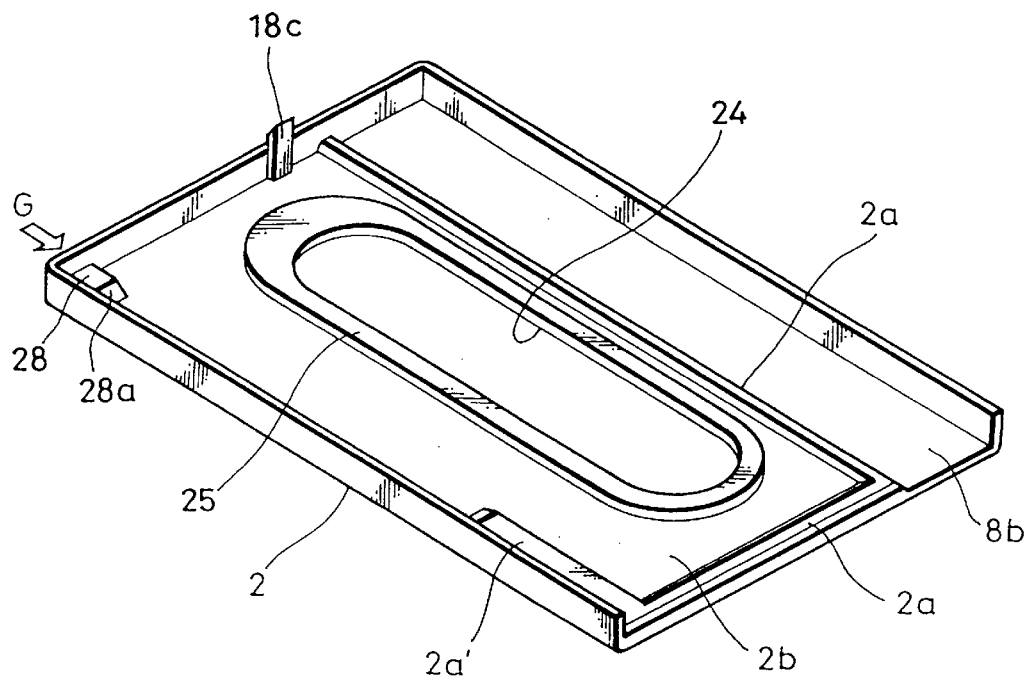
FIG. 18 is a perspective view of an improved upper half seen from its rear surface.

FIG. 18 shows an upper half 2 of the cassette accommodating case which prevents generation of scratches and shavings caused when the compact cassette is inserted or drawn and which prevents any sink mark from being formed on the thick portion of the case portion.

In the upper half 2, a depth direction portion of the frame-shaped thick portion 2a on the opposite side of the guide groove 8b of the thick portion 2a is formed as a thick portion 2a' which starts from the cassette insertion opening and is short in the depth direction. Other portions thereof are formed of the thin portion 2b. Specifically, an depth side end portion of the short thick portion 2a' substantially reaches a position in parallel to the reel stopper piece 11 close to the cassette insertion opening 3 side of the reel stopper member fixed by caulking on the bottom surface of the lower half 1 as shown in FIG. 3 which is a cross-sectional view of the cassette accommodating case.

A short cassette receiving portion 28 having an inclined surface 28a is formed at the innermost portion of the upper half 2 in the direction extended from the above short thick portion 2a'. The thickness of the cassette receiving portion 28 is made same as that of the short thick portion 2a'.

Figure 19:
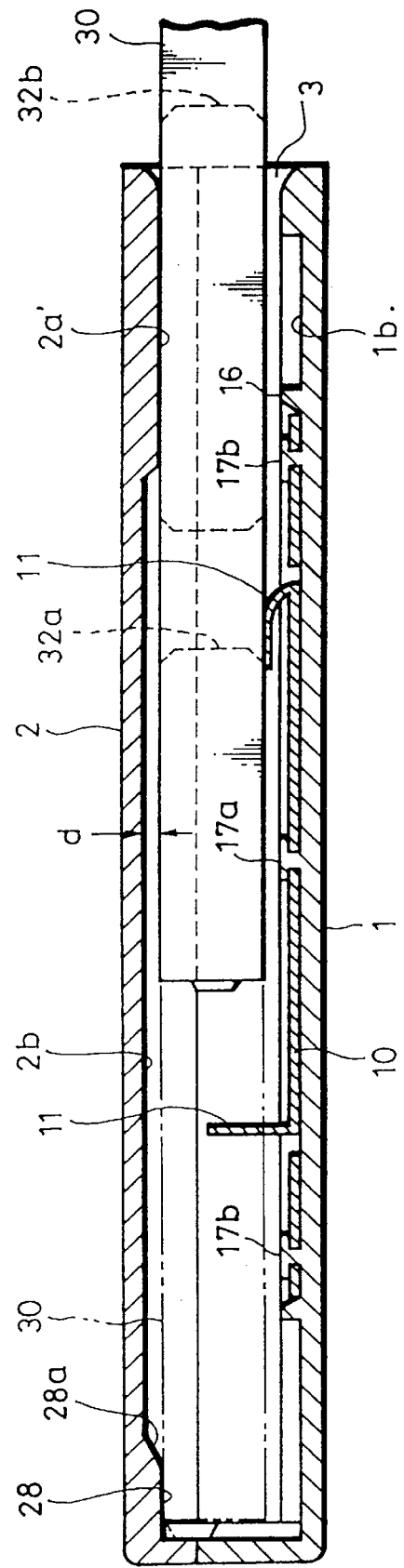
FIG. 19 is an enlarged view of a longitudinal cross section of an improved cassette accommodating case when the compact cassette is being accommodated therein.
Figure 20:
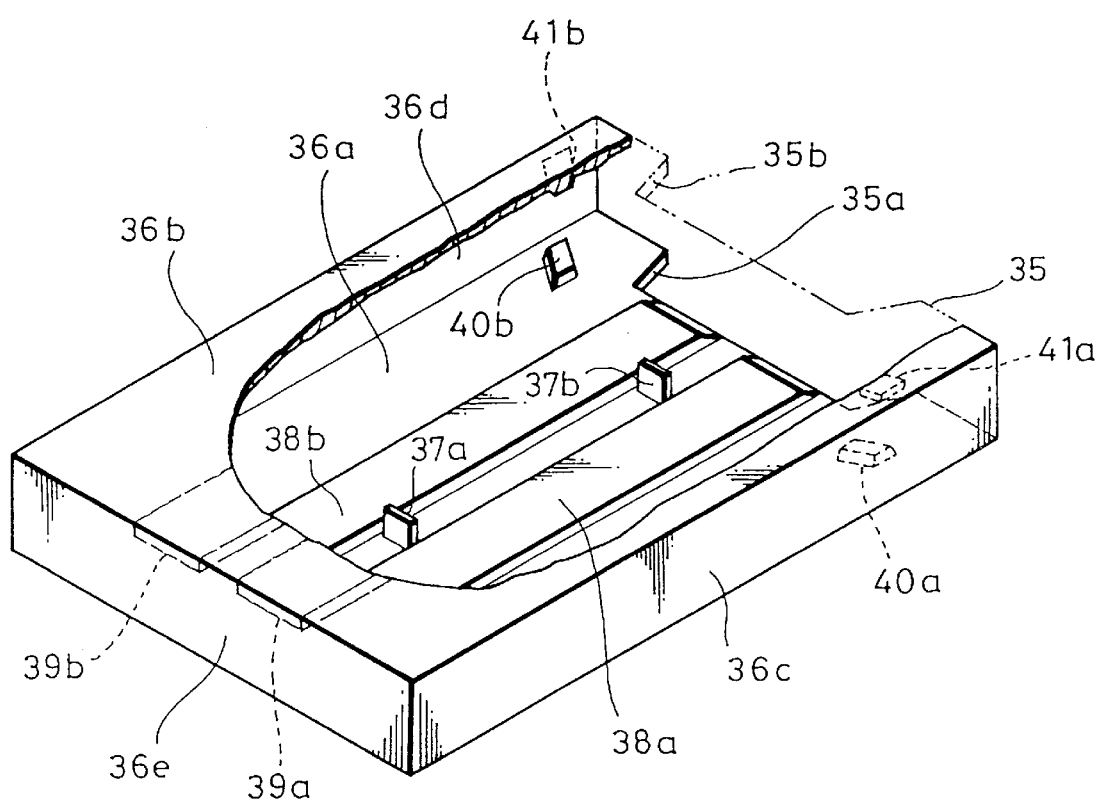
FIG. 20 is a partially cut-away, perspective view of a conventional cassette accommodating case.
Figure 22:
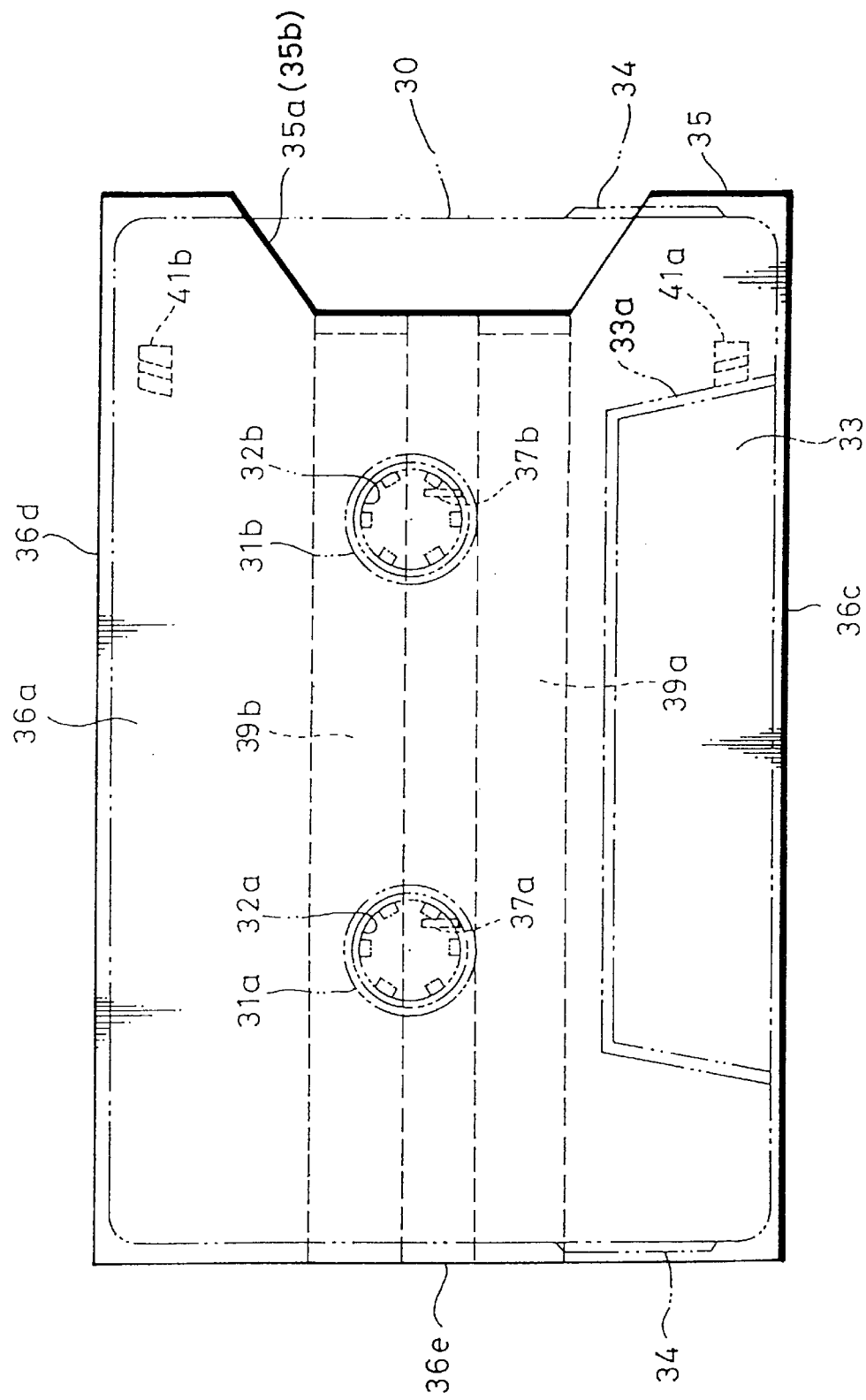
FIG. 22 is a plan view of the conventional cassette accommodating case.
Figure 23:
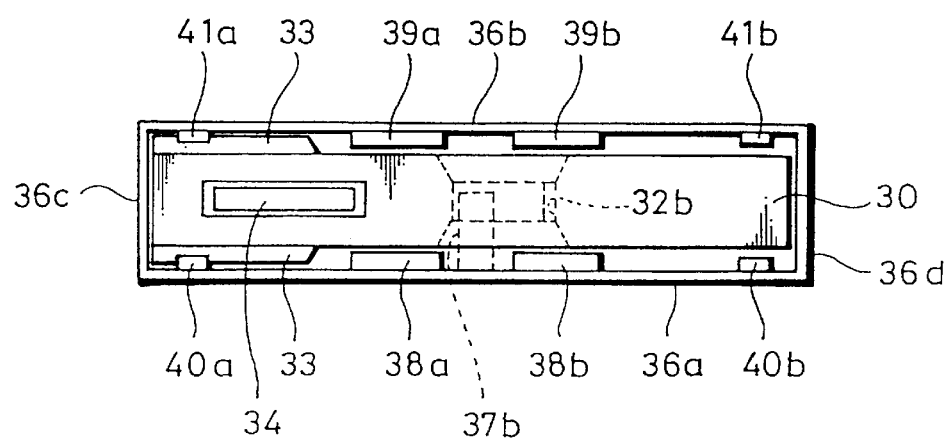
FIG. 23 is a front view of the cassette accommodating case seen from its cassette insertion opening.

FIG. 19 is a cross-sectional view of the cassette accommodating case thus arranged cut from the thick portion 2a' of the upper half 2.

When the compact cassette 30 is inserted through the cassette insertion opening 3, the trapezoid projection portion 33 is respectively guided by the guide grooves 8a, 8b and the cassette lower and upper surfaces thereof on the opposite side of the projection portions 33 are guided by the thick portions 1a, 2a of the lower and upper halves 1, 2, respectively. When the compact cassette 30 elastically deforms the reel stopper piece 11 on the insertion opening side and presses it down to be moved thereon, the compact cassette 30 is simultaneously raised by the elastic returning force of the reel stopper piece 11. When the compact cassette 30 is pressed up by the reel stopper piece 11, the cassette tip end portion has passed the short thick portion 2a' and is being moved toward the thin portion 2b. As a result, a sufficient space d is secured between the cassette upper surface and the inner surface of the upper half 2, which prevents the cassette upper surface from rubbing the upper half 2 upon the insertion of the cassette. Therefore, it is possible to prevent generation of the scratches and shavings on both of the cassette and the case. The above action is carried out similarly every time when the compact cassette 30 is inserted into or drawn from the cassette accommodating case.

When the compact cassette 30 is completely accommodated in the cassette accommodating case, the tip end portion of the cassette is slid on the inclined surface 28a provided in the innermost portion of the upper half 2, and then the upper surface of the cassette 30 is brought in contact with the surface of the cassette receiving portion 28 as shown by a phantom line in FIG. 19. Specifically, since the cassette 30 in its accommodated state is guided by the thick portion 1a of the lower half 1 at the cassette lower surface at the cassette portion on the opposite side of the trapezoid projection portion 33 and by the short thick portion 2a' and the cassette receiving portion 28 at the cassette upper surface thereof, it is possible to stably accommodate the cassette in the cassette accommodating case without the cassette being fluctuated vertically in the case.

Since the upper half 2 has the short thick portion 2a' formed at a position starting from the cassette insertion opening 3 side in the depth direction and the thin portion 2b formed at other portions thereof, it is possible to avoid a sink mark at the border portion between the thick portion 2a' and the thin portion 2b when the upper half 2 is molded. The reason for this is, for example, that the thick portion 2a' is short and hence a resin amount required therefor is small and that the thick portion 2a' is located away from the gate G for supplying resin and hence is cooled uniformly. When in the embodiment shown in FIG. 18 the gate G is provided at the case outer surface on the side of the thick cassette receiving portion 28, since the resin amount required for the cassette receiving portion 28 is small, it is possible to prevent the generation of a sink mark at the case portion in the vicinity of the gate G.

According to the above cassette accommodating case, it is possible to prevent the generation of the scratches and the shavings resulting from the rub upon the insertion or drawing of the cassette, and also to stably accommodate the cassette without the cassette in its accommodated state being fluctuated. Moreover, there can be achieved an effect in which any sink mark on the thick portion is prevented from occurring upon the molding of the upper half and hence the function and quality of the cassette accommodating case can be improved.

INDUSTRIAL APPLICABILITY

A cassette accommodating case according to the present invention is suitable for an accommodating case in or from which an audio compact cassette or the like is slidably inserted or drawn.

EXPLANATION OF REFERENCE NUMBERS

1 lower half
1a thick portion
1b thin portion
2 upper half
2a thick portion
2a' short thick portion
2b thin portion
3 cassette insertion opening
8a, 8b guide grooves
9 reel stopper member
10 base plate
10a, 10b caulking and fixing apertures
11 reel stopper piece
11a reel stopper piece portion
12 notch portion
13 slit groove
15 concave portion
16 guide rib
16a tapered surface
17a, 17b caulking pins
18a, 18b, 18c positioning pieces
19 cassette-release preventing member
20 cassette-release preventing piece
21 release preventing convex portion
22 erroneous-erasure preventing click of cassette
24 2finger-insertion opening portion
24a slope surface
28 cassette receiving portion
30 compact cassette

What is claimed is:

1. A cassette accommodating case which is a cassette housing having, at one case side surface, a cassette insertion opening where a cassette is slidably inserted and drawn and formed by integrating an upper half and a lower half each having a concave guide groove at one side of said cassette insertion opening for guiding a trapezoid projection portion of the cassette from said cassette insertion opening in the case depth direction, characterized by comprising:

a finger-insertion opening portion formed on an upper surface of said upper half so as to be oval in the case depth direction and used for drawing a cassette;

a reel stopper member in which a pair of reel stopper pieces engaged with reel hub apertures of said cassette and capable of rising and being pressed down are planted from a base plate fixed on a bottom surface of said lower half;

a guide rib surrounding a circumference of said base plate of said reel stopper member, provided on a bottom surface of said lower half; and a traverse U-letter shaped slit groove formed through said base plate portion where said reel stopper pieces are planted, thereby said reel stopper member being formed so as to have a flexible base plate which is deformed flexibly.

2. A cassette accommodating case according to claim 1, characterized in that an inclined surface is formed at an opening inner edge of said cassette insertion opening except said guide groove, thereby said cassette insertion opening having a wide opening.

3. A cassette accommodating case according to claim 1, characterized in that each of said upper half and said lower half has a traverse U-letter frame shaped thick portion on a half surface except said guide groove, and a thin portion on a half surface except said thick portion.

4. A cassette accommodating case according to claim 1, characterized in that a tapered surface for guiding and positioning said base plate is formed in an inner periphery portion of said guide rib.

5. A cassette accommodating case according to claim 1, characterized in that said finger-insertion opening portion is set larger than an outer shape of said base plate of said reel stopper member and said reel stopper member can be inserted through said finger-insertion opening portion.

6. A cassette accommodating case according to claims 1 to 5, characterized in that said finger-insertion opening portion has a gentle slope surface formed at an opening edge on the opposite side of the side of said cassette insertion opening.

7. A cassette accommodating case according to claim 1, characterized in that said reel stopper piece has a slit formed at an inner portion form a tip end portion towards said base plate as a plurality of divided, flexible reel stopper piece portions.

8. A cassette accommodating case according to claim 1, characterized in that a concave portion for absorbing deformation of said reel stopper piece resulting from said reel stopper piece being pressed down is formed on a bottom surface portion of said lower half corresponding to said flexible base plate.

9. A cassette accommodating case according to claim 1, characterized in that said reel stopper piece is positioned to be engageable with a reel hub aperture of said cassette at a position displaced from a center of the hub aperture toward a cassette insertion opening side.

10. A cassette accommodating case according to claim 1, characterized in that said reel stopper member is fixed by caulking by inserting caulking pins projected from a bottom surface of said lower half through at least two caulking and fixing apertures formed at both end portions of said base plate.

11. A cassette accommodating case according to claim 10, characterized in that said caulking and fixing apertures of said base plate have oval apertures extended outward from aperture positions set in view of design with respect to said calking pins and absorb positional displacement thereof from said caulking and fixing pins resulting from thermal shrinkage of said reel stopper member.

12. A cassette accommodating case according to claim 1, characterized in that at least a slit groove, corresponding to a rear surface side of said reel stopper piece, of said slit groove is formed as a bent groove, thereby a stopper piece of another reel stopper member being prevented from being inserted into said bent groove when said reel stopper member is automatically supplied.

13. A cassette accommodating case which is a cassette housing having, at one case side surface, a cassette insertion opening where a cassette is slidably inserted and drawn and formed by integrating an upper half and a lower half each having a concave guide groove at one side of said cassette insertion opening for guiding a trapezoid projection portion of the cassette from said cassette insertion opening in the case depth direction, characterized by comprising a finger-insertion opening portion formed on an upper surface of said upper half so as to be oval in the case depth direction and used for drawing a cassette, having a gentle slope surface formed at an opening edge on the opposite side of the side of said cassette insertion opening; and a cantilever-shaped cassette-release preventing member having an elastic function and engaged with a concave portion at a rear surface of said cassette in an accommodated state and provided at an inner wall surface of said cassette housing in the vicinity of the opposite side of said cassette insertion opening.

14. A cassette accommodating case according to claim 13, characterized in that an inclined surface is formed at an opening inner edge of said cassette insertion opening except said guide groove, thereby said cassette insertion opening having a wide opening.

15. A cassette accommodating case according to claim 13, characterized in that each of said upper half and said lower half has a traverse U-letter frame shagged thick portion on a half surface except said guide groove, and a thin portion on a half surface except said thick portion.

16. A cassette accommodating case according to claim 13, characterized in that a guide rib for surrounding a circumference of said base plate of said reel stopper member is provided on a bottom surface of said lower half and a tapered surface for guiding and positioning said base plate is formed in an inner periphery portion thereof.

17. A cassette accommodating case according to claim 13, characterized in that said finger-insertion opening portion is set larger than an outer shape of said base plate of said reel stopper member and said reel stopper member can be inserted through said finger-insertion opening portion.

18. A cassette accommodating case according to claim 13, characterized in that said cassette-release preventing member is positioned on a side wall side of said cassette housing, being engaged with a concave portion of an erroneous-erasure preventing click provided on a cassette rear surface which is a plane in parallel to the cassette insertion direction.

19. A cassette accommodating case which is cassette housing having, at one case side surface, a cassette insertion opening where a cassette is slidably inserted and drawn and formed by integrating an upper half and a lower half each having a concave guide groove at one side of said cassette insertion opening for guiding a trapezoid projection portion of the cassette from said cassette insertion opening in the case depth direction, characterized by comprising a finger-insertion opening portion formed on an upper surface of said upper half so as to be oval in the case depth direction and used for drawing a cassette;

a reel stopper member in which a pair of reel stopper pieces engaged with reel hub apertures of said cassette and capable of rising and being pressed down are planted from a base plate and fixed on a bottom surface of said lower half;

a traverse U-letter shaped slit groove formed through said base plate portion where said reel stopper pieces are planted, thereby said reel stopper member being formed so as to have a flexible base plate which is deformed flexibly, and a cantilever-shaped cassette-release preventing member having an elastic function and engaged with a concave portion at a rear surface of said cassette in an accommodated state and provided at an inner wall surface of said cassette housing in the vicinity of the opposite side of said cassette insertion opening, wherein a rear surface side of said slit groove of said reel stopper piece is formed as a bent groove, thereby preventing another stopper piece of another reel stopper member from being inserted into said bent groove.

20. A cassette accommodating case according to claim 19, characterized in that an inclined surface is formed at an opening inner edge of said cassette insertion opening except said guide groove, thereby said cassette insertion opening having a wide opening.

21. A cassette accommodating case according to claim 19, characterized in that each of said upper half and said lower half has a traverse U-letter frame shaped thick portion on a half surface except said guide groove, and a think portion on a half surface except said thick portion.

22. A cassette accommodating case according to claim 19, characterized in that a guide rib for surrounding a circumference of said base plate of said reel stopper member is provided on a bottom surface of said lower half and a tapered surface for guiding and positioning said base plate is formed in an inner periphery portion thereof.

23. A cassette accommodating case according to claim 19, characterized in that said finger-insertion opening portion is set larger than an outer shape of said base plate of said reel stopper member and said reel stopper member can be inserted through said finger-insertion opening portion.

24. A cassette accommodating case according to claim 19 or 23, characterized in that said finger-insertion opening portion has a gentle slope surface formed at an opening edge on the opposite side of the side of said cassette insertion opening.

25. A cassette accommodating case according to claim 19, characterized in that said reel stopper piece has a slit formed from a tip end portion to said base plate as a plurality of divided, flexible reel stopper piece portions.

26. A cassette accommodating case according to claim 19 or 25, characterized in that a concave portion for absorbing deformation of said reel stopper piece resulting from being pressed down is formed on a bottom surface portion of said lower half corresponding to said flexible base plate.

27. A cassette accommodating case according to claim 19, characterized in that said reel stopper piece is positioned to be engageable with a reel hub aperture of said cassette at a position displaced from a center of the hub aperture toward a cassette insertion opening side.

28. A cassette accommodating case according to claim 19, characterized in that said reels stopper member is fixed by caulking by inserting caulking pins projected from a bottom surface of said lower half through at least two caulking and fixing apertures formed at both end portions of said base plate.

29. A cassette accommodating case according to claim 28, characterized in that said caulking and fixing apertures of said base plate have oval apertures extended outward from aperture positions set in view of design with respect to said caulking pins and absorb positional displacement thereof from said caulking a fixing pins resulting from thermal shrinkage of said reel stopper member.

30. A cassette accommodating case according to claim 19, characterized in that said cassette-release preventing member is positioned on a side wall side of said cassette housing, being engaged with a concave portion of an erroneous-erasure preventing click provided on a cassette rear surface which is a plane in parallel to the cassette insertion direction.

* * * * *